(12) United States Patent
Patinkin

(10) Patent No.: US 7,574,409 B2
(45) Date of Patent: Aug. 11, 2009

(54) METHOD, APPARATUS, AND SYSTEM FOR CLUSTERING AND CLASSIFICATION

(75) Inventor: Seth Patinkin, Bloomington, IN (US)

(73) Assignee: Vericept Corporation, Waltham, MA (US)

(*) Notice: Subject to any disclaimer, the term of this patent is extended or adjusted under 35 U.S.C. 154(b) by 894 days.

(21) Appl. No.: 10/983,258

(22) Filed: Nov. 4, 2004

(65) Prior Publication Data

US 2006/0095521 A1    May 4, 2006

(51) Int. Cl.
    *G06F 15/18*    (2006.01)
(52) U.S. Cl. ........................................... 706/12
(58) Field of Classification Search .................. None
    See application file for complete search history.

(56) References Cited

U.S. PATENT DOCUMENTS

| | | | |
|---|---|---|---|
| 1,261,167 | A | 4/1918 | Russell |
| 5,032,987 | A | 7/1991 | Broder et al. |
| 5,909,677 | A | 6/1999 | Broder et al. |
| 5,953,503 | A | 9/1999 | Mitzenmacher et al. |
| 5,974,481 | A | 10/1999 | Broder |
| 5,991,808 | A | 11/1999 | Broder et al. |
| 6,073,135 | A | 6/2000 | Broder et al. |
| 6,088,039 | A | 7/2000 | Broder et al. |
| 6,119,124 | A | 9/2000 | Broder et al. |
| 6,195,698 | B1 | 2/2001 | Lillibridge et al. |
| 6,230,155 | B1 | 5/2001 | Broder et al. |
| 6,269,362 | B1 | 7/2001 | Broder et al. |
| 6,286,006 | B1 | 9/2001 | Bharat et al. |
| 6,292,762 | B1 | 9/2001 | Moll et al. |
| 6,349,296 | B1 | 2/2002 | Broder et al. |
| 6,385,609 | B1 * | 5/2002 | Barshefsky et al. ............ 707/6 |
| 6,389,436 | B1 | 5/2002 | Chakrabarti et al. |
| 6,438,740 | B1 | 8/2002 | Broder et al. |
| 6,445,834 | B1 | 9/2002 | Rising, III |
| 6,487,555 | B1 | 11/2002 | Bharat et al. |
| 6,560,600 | B1 | 5/2003 | Broder |
| 6,658,423 | B1 | 12/2003 | Pugh et al. |
| 6,665,837 | B1 | 12/2003 | Dean et al. |
| 6,687,416 | B2 | 2/2004 | Wang |

(Continued)

OTHER PUBLICATIONS

Adapted One-versus-All Decision Trees for Data Stream Classification Hashemi, Sattar; Yang, Ying; Mirzamomen, Zahra; Kangavari, Mohammadreza; Knowledge and Data Engineering, IEEE Transactions on vol. 21, Issue 5, May 2009 pp. 624-637 Digital Object Identifier 10.1109/TKDE.2008.181.*

(Continued)

*Primary Examiner*—Michael B Holmes
(74) *Attorney, Agent, or Firm*—Hogan & Hartson LLP

(57) ABSTRACT

The invention provides a method, apparatus and system for classification and clustering electronic data streams such as email, images and sound files for identification, sorting and efficient storage. The inventive systems disclose labeling a document as belonging to a predefined class though computer methods that comprise the steps of identifying an electronic data stream using one or more learning machines and comparing the outputs from the machines to determine the label to associate with the data. The method further utilizes learning machines in combination with hashing schemes to cluster and classify documents. In one embodiment hash apparatuses and methods taxonomize clusters. In yet another embodiment, clusters of documents utilize geometric hash to contain the documents in a data corpus without the overhead of search and storage.

16 Claims, 24 Drawing Sheets

U.S. PATENT DOCUMENTS

| | | | |
|---|---|---|---|
| 6,711,568 | B1 | 3/2004 | Bharat et al. |
| 6,732,149 | B1 | 5/2004 | Kephart |
| 7,281,664 | B1 * | 10/2007 | Thaeler et al. ......... 235/462.49 |
| 7,295,966 | B2 * | 11/2007 | Barklund et al. ................ 704/9 |
| 7,333,966 | B2 * | 2/2008 | Dozier ......................... 706/21 |
| 7,349,386 | B1 * | 3/2008 | Gou ............................ 370/356 |
| 7,353,215 | B2 * | 4/2008 | Bartlett et al. ................ 706/46 |
| 7,370,314 | B2 * | 5/2008 | Minami et al. ................ 716/21 |
| 7,389,178 | B2 * | 6/2008 | Raz et al. .................... 701/200 |
| 7,406,603 | B1 * | 7/2008 | MacKay et al. ............. 713/193 |
| 7,451,458 | B2 * | 11/2008 | Tuchow ....................... 719/328 |
| 7,463,774 | B2 * | 12/2008 | Wang et al. ................. 382/218 |
| 7,464,026 | B2 * | 12/2008 | Calcagno et al. ............... 704/9 |
| 7,477,166 | B2 * | 1/2009 | McCanne et al. ............. 341/50 |
| 7,487,321 | B2 * | 2/2009 | Muthiah et al. ............. 711/170 |
| 2004/0049678 | A1 | 3/2004 | Walsmley et al. |
| 2007/0112701 | A1 * | 5/2007 | Chellapilla et al. ............ 706/15 |

OTHER PUBLICATIONS

Ayra, Sunil, et al., "An Optimal Algorithm for Approximate Nearest Neighbor Searching in Fixed Dimensions," J ACM 45 (1998), 1-33.

Arya, Sunil et al., "Approximate nearest neighbor queries in fixed dimensions," 1-11.

Aubert, Gilles et al., "A Variational Method in Image Recovery," vol. 34, No. 5 (Oct. 1997) 1948-1979.

Baytin, Alexander et al., "Threshold Properties of Uniform Spam Filters," Cutter LLC., (Apr. 16, 2004). 1-8.

Bekkerman, Ron et al., "Distributional Word Clusters vs. Words for Text Categorization," Journal of Machine Learning and Research (2002), 1-27.

Brin, Sergey et al., "Copy Detection Mechanisms for Digital Documents," Stanford University, (Oct. 31, 1994), 1-21.

Broder, Andrei Z., "On the Resemblance and Containment of Documents," Digital Systems Research Center, (1998), 21-29.

Buhler, Jeremy, "Efficient Large-Scale Sequence Comparison by Locality-Sensitive Hashing," Univ. of Washington, (2001), 1-10.

Candès, Emmanuel J. et al, "Ridgelets: A Key to Higher-Dimensional Intermittency?," Stanford University, (1999) 1-15.

Candès, Emmanuel J. et al, "Curvelets—A Surprisingly Effective Nonadaptive Representation For Objects with Edges," (2000), 1-16.

Chambolle, Antonin, et al., "Image recovery via total variation minimization and related problems," Numerische Mathematik, (1997) 167-188.

Charikar, Moses S., "Similarity Estimation Techniques from Rounding Algorithms," Princeton Univ., (2002).

Chowdhury, Abdur, "Duplicate Data Detection," Search & Navigation Group, America Online.

Cooper, James W. et al., "A Novel Method for Detecting Similar Documents," IBM T J Watson, (2002), 167-185.

Conrad, Jack G. et al., "Online Duplicate Document Detection: Signature Reliability in a Dynamic Retrieval Environment," Thompson Legal & Regulatory and Thomson-West, 443-452.

Christopoulos, C.A. et al., "JPEG2000: The New Still Picture Compression Standard," 45-49.

Cuttr, "Our Technology Brochure Finding Similar Files in a Large File System."

Dasgupta, Sanjoy et al., "An elementary proof of the Johnson-Lindenstrauss Lemma," Int'l Computer Science Institute. 1-5.

Danerau. Fred J. "A Technique for Computer Detection and Correction of Spelling Errors," IBM Corporation, (Mar. 1964) 171-176.

Do M.N. et al. The Contourlet Transform: An Efficient Directional Multirersolution Image Representation. IEEE Transactions Image on Processing, (Dec. 27, 2004).

Donoho, David L. et al., "Beamlets and Multiscale Image Analysis." 1-196.

Gabor, D., "information Theory in Electron Microscopy," int'i Academy of Pathology, (Jun. 1965), 1-9.

Garcia-Molina, Hector et al., "*dsCAM*: Finding Document Copies Across Multiple Database," Stanford University.

Geman, Stuart, "Statistical Methods for Tomographic Image Reconstruction," Brown University, 5-21.

Gionis, Aristides, et al., "Similarity Search in High Dimensions via Hashing," In VLDB'99, Procedings of 25th International Conference on Very Large Data Bases, (Sep. 7-10, 1999) 518-529.

Gunopulos, Dimitrios et al., "Time Series Similarity Measures," Univ. of California and Microsoft Research, 1-63.

Haveliwala, Taher H. et al., "Evaluating Strategies for Similarity Search on the Web," (May 2002), 1-23.

Indyk, Peter et al., "Approximate Nearest Neighbors: Towards Removing the Curse of Dimensionality," Stanford University, 604-613.

Indyk, Piotr et al., "Fast Image Retrieval via Embeddings," 1-15.

Indyk, Piotr, "Nearest Neighbors in High-Dimensional Spaces," 1-16.

Indyk, Piotr, et al., "Locality-Preserving Hashing In Multidimensional Spaces," Stanford University, 1-2.

Indyk, Piotr et al., "Low Distortion Embeddings of Finite Metric Spaces," 1-20.

Jaccard Paul, "The Distribution of the Flora in the Alpine Zone." "The New Phytologist" Federal Polytechnic, (Feb. 1912) 1-14.

Joachims, Thorsten, "Text Categorization with Support Vector Machines: Learning with Many Relevant Features," Univ. of Dortmund, (Nov. 1997, rev. Apr. 1998), 1-14.

Johnson, William B., "Extensions of Lipschitz Mappings Into a Hilbert Space," (1984) 189-206.

Keller, Mikaela et al., "Theme Topic Mixture Model: A Graphical Model for Document Representation," 1-8.

Kokar, Mieczyslaw M., "On Similarity Methods in Machine Learning," Northeastern University, 1-11.

Kovászany, L.S.G. et al., "Image Processing," IRE, 560-570.

Kramer, Henry P. et al., "Iterations of a Non-Linear Transformation For Enhancement of Digital Images," Pattern Analysis Corp., (1974), 53-58.

Manasse, Mark, "Finding Similar Things Quickly in Large Collections," MSR Silicon Valley.

Manber, Udi, "Finding Similar Files in a Large File System," Univ. of Arizona, (Oct. 1993), 1-10.

Meyer, Francis G. et al., "Brushlets: A Tool for Directional Image Analysis and Image Compression," Yale University, (1996), 147-187.

Mumford, David et al., "Optimal Approximations by Piecewise Smooth Functions and Associated variational Problems," Harvard University and Northeastern University (1989) 577-655.

Osher, Stanley et al., "Fronts Propagating with Curvature-Dependent Speed: Algorithms Based on Hamilton-Jacobi Formulations," Journal of Computational Sciences (1988), 12-49.

Perona, Pietro et al., "Scale-Space and Edge Detection Using Anisotropic Diffusion," IEE vol. 12 No. 7 (Jul. 1990) 629-639.

Philips, Lawrence, "Hanging on the Metaphone," (Dec. 1990), 39-43.

Philips, Lawrence, "The Double Metaphone Search Algorithm," Veridity Inc., (Jun. 2000) vol. 79 1-4.

Rama, Vijayshankar, "Locality Preserving Dictionaries: Theory & Application to Clustering in Databases," UC Berkeley, 337-345.

Rudin, Leonid I. et al., "Feature-Oriented Image Enhancement with Shock Filter, I," California Institute of Technology. Dept. of Computer Science California Institute of Tech. 1-28.

Ross, Suzanne, "Does Time Change All?" (2004) 1-2.

Rubner, Yossi et al., "A Metric for Distributions with Applications to Image Databases," IEE (1998).

Search Tools.com, "Testing Search Indexing Using Anchor Text," (2001-2003).

Sebastiani, Fabrizio, "Machine Learning in Automated Text Categorization," ACM Computing Surveys, vol. 34 No. 1, (Mar. 2002), 1-47.

Shankhnarovic, Gregory et al., "Fast Pose Estimation with Parameter Sensitive Hashing," Massachusetts Institute of Technology, (Apr. 2003), 1-11.

Shannon, C.E., "A Mathematical Theory of Communication," (Dec. 1957), 5-83.

Shivakumar, Narayanan et al., "Building a Scalable and Accurate Copy Detection Mechanism," Stanford University, Dept. of Computer Science.

Shivakumar, Narayanan et al., "Finding Near-Replicas of Documents on the Web," Stanford University, Dept. of Computer Science.

Shivakumar, Narayanan et al., "SCAM: A Copy Detection Mechanism for Digital Documents," Stanford University, Dept. of Computer Science.

Singhal, Amit et al., "Automatic Text Browsing Using Vector Space Model," Cornell University 1-8.

Vempala, Santosh et al. A Special Algorithm for Learning Mixture Models, Journal of Computer and System Sciences 68 (2004), 841-860.

Wong, S.K.M. et al., "Vector Space Model of Information Retrieval—A Reevaluation*," University of Regina, 167-183.

Aery, M., et al. eMailSift: Adapting Graph Mining Techniques for Email Classification, Technical Report CSE-2004-7, Jul. 2004, cited pp. 2-5.

Metzger, J., et al., A Multiagent-Based Peer-to Peer Network in Java for Distributed Spam Filtering, Springer-Verlag Berlin Heidelberg, Jun. 2003, cited passages pp. 621.

Airoldi, El, et. al. ScamSlam: An Architecture for Learning the Criminal Relations Behind Scam Spam, Data Privacy Lab., Inst for Software Research Intl, CMU-ISRI-04-121, May 2004, cited passages pp. 1-6.

Damiani, E., et al., An Open Digest-Based Technique for Spam Detection, in Proc. of 2004 Intl Workshop on Security in Parallel and Distributed Systems, San Francisco, CA, Sep. 2004, cited passages pp. 1-6.

International Search Report - PCT/US/05/39718, Jul. 7, 2006.

* cited by examiner

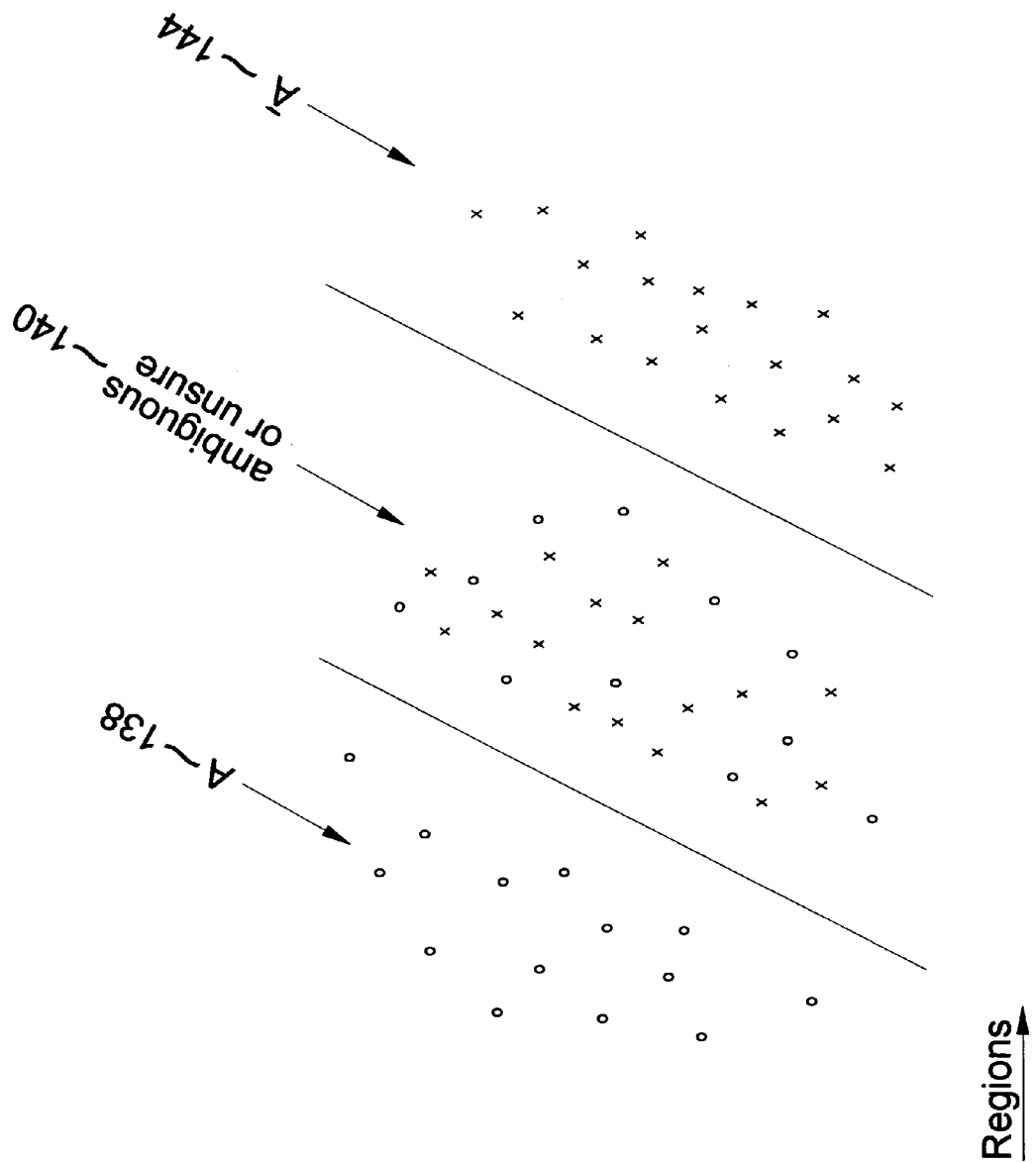

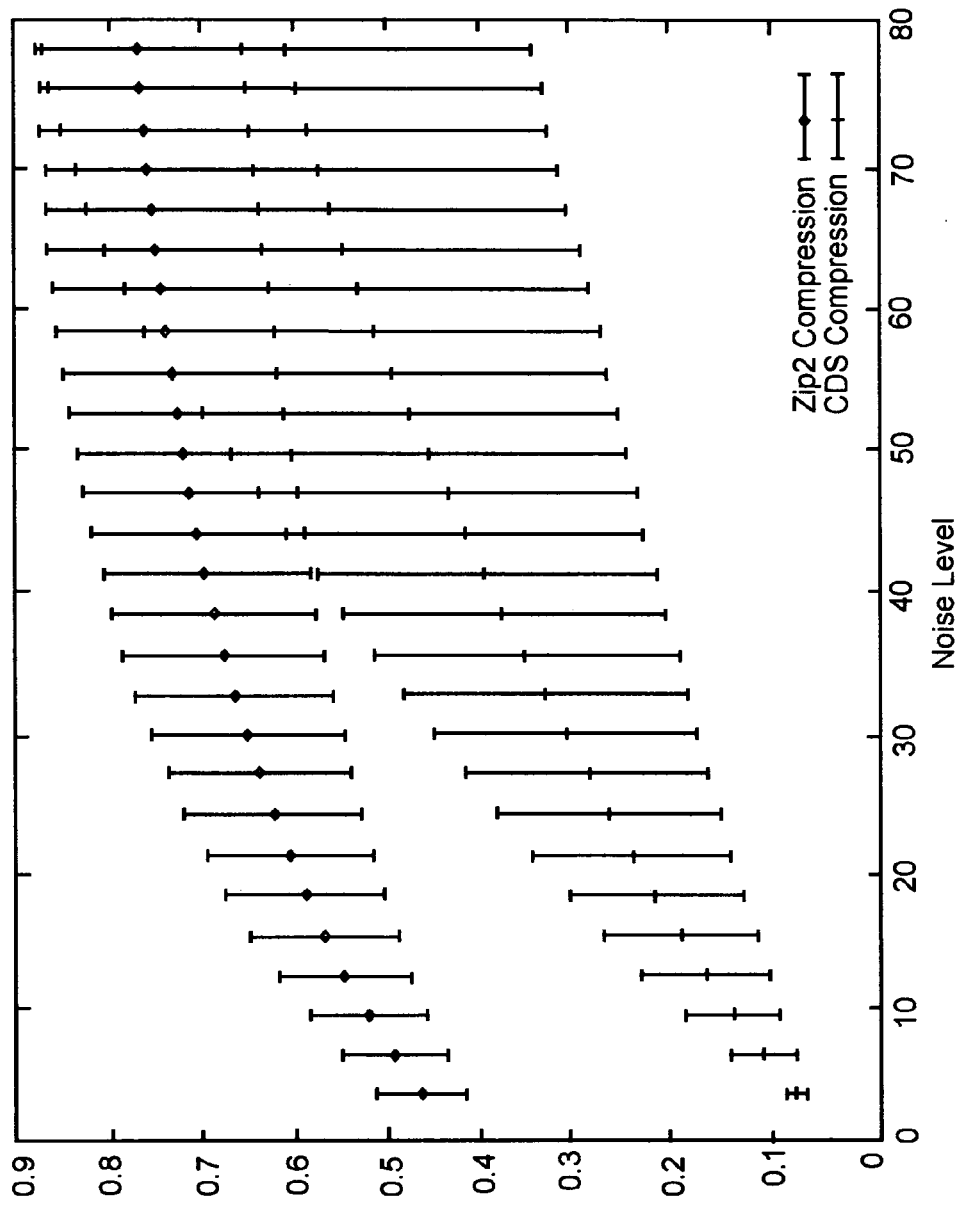

METHOD, APPARATUS, AND SYSTEM FOR CLUSTERING AND CLASSIFICATION

BACKGROUND OF THE INVENTION

1. Field of the Invention

This application is related to the field of coded data generation or conversion as applied otherwise to identifying patterns of electronic data structures.

2. Description of the Prior Art

Document clustering and classification techniques can provide an overview or identify a set of documents based upon certain criteria, which amplifies or detects certain patterns within its content. In some applications these techniques lead to filtering unwanted email and in other applications they lead to effective search and storage strategies. An identification strategy may for example divide documents into clusters so that the documents in a cluster are similar to one another and are less similar to documents in other clusters, based on a similarity measurement. One refers to the process of clustering and classification as labeling. In demanding applications labeling can greatly improve the efficiency of an enterprise, especially for storage and retrieval applications, provided that it is stable, fast, efficient, and accurate.

Users of information technology must effectively deal with countless unwanted emails, unwanted text messages and crippling new viruses and worms every day. This largely unnecessarily high volume of network traffic decreases worker productivity and slows down important network applications. One of the most serious problems in today's digital economy has to do with the increasing volume of spam. As such, recipients of email as well as the service providers need effective solutions to reduce its proliferation on the World Wide Web. However, as spam detection becomes more sophisticated, spammers invent new methods to circumvent detection. For example, one prior art methodology provides a centralized database for maintaining signatures of documents having identified attributes against which emails are compared, however, spammers now modify the content of their email either slightly or randomly such that the message itself may be intelligible, but it evades detection under various anti-spam filtering techniques currently employed.

Currently, at least 30 open relays dominate the world, bursting messages at different rates and different levels of structural variation. Because certain types of email mutate or evolve, as exemplified by spam, spam-filtering detection algorithms must constantly adjust to be effective. In the case of spam email, for example, the very nature of the spam corpus undergoes regime changes. Therefore, clustering optimality depends heavily on the nature of the data corpus and the changes it undergoes.

The objective of an effective detection of documents having identified attributes or email classification schemes is to find similar messages. Many clusters of email represented by spam, e-vites, mailing lists; emails are forwarded many times within the enterprise; and targeted mailings from websites. What the enterprise then does with these clusters is left to the discretion of the enterprise. As such, it is essential to define a clear notion of metrics in the space of the clusters. In plain words, given two electronic data streams associated with a document, a system must be able to produce a number referred to as "the distance" that describes in some meaningful way how similar or close two messages are.

To work effectively as a detector for different categories of email, a classifier must establish the parameters of the distance function and the threshold carefully. For instance, if the threshold is too high, the classifier will produce too many false positives. The same can happen if the threshold is chosen unreasonably low.

Generally the choice of a metric is dictated by the choice of classifier or filter. In regards to filters, given two messages, X and X', a system can generate electronic data streams or signature arrays, $(f_1, f_2, \ldots, f_n)$ and $(f'_1, f'_2, \ldots, f'_n)$ where n is the number of filters.

Comparing these two arrays requires specification of a metric and a threshold for each filter in the set. Thus, for example, the two messages belong to the same spam class, if and only if all of the following conditions hold simultaneously:

$$d(f_1, f'_1) < \tau_1$$

$$d(f_2, f'_2) < \tau_2$$

$$\ldots$$

$$d(f_n, f'_n) < \tau_n$$

where the $\tau_n$ is the numerical threshold values suitably chosen for each of the filters and d represents a function of the distance between two filter values.

The Nilsimsa Signature ("NS") method counts 3-gram occurrences with the same hash values in the message body of an email and serves as an example of one spam detection schema [see, http://ixazon.dynip.com/~cmeclax/nilsimsa.html]. NS ignores text mutations because they are deemed statistically irrelevant. Given a message, NS produces a sequence of 64 hexadecimal numbers. For instance, if NS consisted only of four bits, the distance between the two codes 1001 and 0001 would be 1 because only the first bits of the two signatures differ. An important aspect of NS is that changing the input text does not change all of the entries in the code. In the method of the present invention, small changes to the input text causes all of the entries in the code to change.

One method to detect spam creates a hash value referred to as MD5, which is found to be relatively ineffective as a means for identifying spam because once a message is changed slightly, the hash value changes significantly. Although these methods work effectively for identifying absolutely identical messages, the nature of spam detection evasion means that the senders of spam will continue to incorporate differences that will produce significantly different MD5 outcomes (a simple permutation of two letters in a "pure" message will render an MD5 check completely useless for purposes of spam detection).

Using several filters reduces false positives by subjecting email messages to more scrutiny. If each of its 64 values were considered a single filter, NS could be viewed as a set of filters. A metric might then be defined as the number of differing bits for each separate number. The drawback of such a method is that the distance thus defined cannot exceed four, because the numbers are hexadecimal. Each filter by itself is quite primitive. The method might be made more robust by increasing the radix as achieved through changing the algorithm or by joining adjacent filters into an overall larger filter and thus decreasing the number of filters.

In addition to deploying several filters, a problem persists in that it remains a requirement that thresholds be chosen. Unfortunately, no systematic approach exists to choose the threshold even for one filter other than through an heuristic process of visual inspection of how emails are tagged as similar to one another and through trial and error as to what produces an acceptable detection of documents having identified attributes. When several filter values must be taken into account, filtering depends on all the thresholds and, therefore, finding the optimal thresholds through such a trial and error process presents a formidable undertaking. Three solutions are possible: (1) hard-code the thresholds into the software; (2) perform optimization checks manually and regularly; and/or (3) perform optimization automatically.

To succeed with the first solution one has to solve the optimization problem based on the current spam trends. However, even if it were to succeed in filtering a certain type of email today, no guarantee exists that it will be adequate tomorrow. The second solution may prove laborious. However, the inventors have determined a solution to the optimization problem for certain types of email recognition, which alleviates the shortcomings of the prior art by utilizing a combination of learning machines and special classes of uniform filters and stackable hash that allows a systematic investigation, determination and optimization of thresholds to compare the similarity or identity of electronic data streams and place them into clusters or classifications. As pertains to the classification and clustering of electronic documents, the invention further strives to minimize preprocessing time and execution time of the computer processes while maximizing the stability and accuracy of results.

SUMMARY OF THE INVENTION

The present invention pertains to a computer method, apparatus and system for identifying and classifying an electronic data stream, as such comprises the information content for electronic mail, images and sound files (collectively referred to as a data corpus) as belonging to a predefined class. The steps for identifying and classifying is accomplished by one or more learning machines, such as a neural network processor ("NN"), a support vector machine ("SVM") or a naïve-bayes processor ("NB"). If the electronic data stream is determined ambiguous, a K-NN processor attempts to provide for placement within a class or cluster of similar electronic data streams.

The invention also provides a method for combining SVM, NN, NB, K-NN, and other machine-learning methods, with hash technology such as a uniform filter technology and a stackable hash technology to provide for a more accurate text-classification by clustering than might be obtained using the machine-learning methods and associated technology alone.

The invention also provides a method for producing a taxonomy on a data corpus based on the meaningful (e.g., semantic) content of the underlying data object. In one embodiment the invention utilizes a computer method, apparatus and system for detecting patterns in email for purposes of clustering by creating a hash related to the email, and also using the hash to produce an N-character digest of the email in order to score the salience of a received type of email into categories, such as spam, pornography or critical intelligence. The method determines similarity of digests computed from known message types to email received-over the internet. In one embodiment the received email is parsed into a sequence of content symbols having numerical values. The method computes a digest representing known sampled emails, using an algorithm to group similar sets of digests, after which they are archived for retrieval. Thereafter, the method computes a new digest from a received email by parsing and creating a sequence of content symbols having numerical value based upon the algorithm. New digests are compared to one or more similar sets of sampled digests to determine the smallest difference between the new digest and a member of the sampled digests, thereby determining data similarity between the two digests.

One embodiment of the invention comprises a set of hash filters, wherein each filter in the set is formed from a function of a matrix of random numbers and a function of a random variable such that a first set of variable electronic signal inputs, typically characterizing sampled emails, and one of the matrix of random numbers produced by the same random function, generates a database of output signatures that have a statistical identity to a second set of electronic signal inputs, typically characterizing emails under scrutiny. Each uniform filter in the set differs by a statistically related seed used for the initialization of such a function. The two email output sets are compared to a threshold used to measure the degree of relatedness of the two emails thus created.

One embodiment of the present invention also comprises an optional "stackable hash" which allows for the implementation of a mask for culling out regions of clusters. Additionally, the method utilizes a low-collision hash on a sufficiently high-resolution lattice on the square.

BRIEF DESCRIPTION OF THE DRAWINGS

The invention is best understood from the following detailed description when read in connection with the accompanying drawing. The various features of the drawings are not specified exhaustively. On the contrary, the various features may be arbitrarily expanded or reduced for clarity. Included in the drawing are the following figures:

FIG. 1c shows a cluster space divided into three regions.

FIG. 10 shows a diagram of the compression ratios.

DETAILED DESCRIPTION OF THE INVENTION

In the figures to be discussed, the circuits and associated blocks and arrows represent functions of the process according to the present invention, which may be implemented as electrical circuits and associated wires or data busses, which transport electrical signals. Alternatively, one or more associated arrows may represent communication (e.g., data flow) between software routines, particularly when the present method or apparatus of the present invention is a digital process.

Figure 1A:
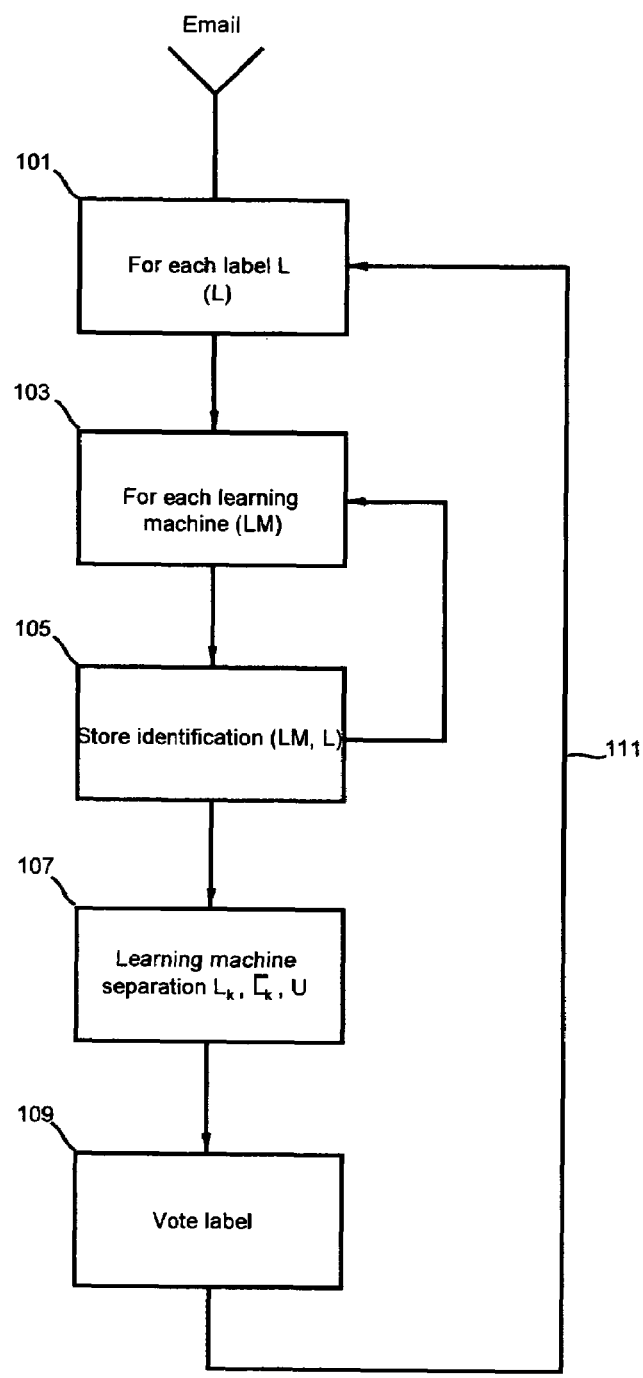
FIG. 1a shows in overview a flow chart of one aspect of the present invention.

FIG. 1*a* provides an overview of the inventive method for classifying, separating and storing emails based upon one or more novel document classification schemes. Email is received 101 for purposes of applying an identifying label, such as whether an email pertains to finances, law and taxes or any subject for which emails might be sent over the World Wide Web. The email is subjected to a process for identification 103 as provided by one or more learning machines. An identification or label is produced and stored for each learning machine process utilized 105. After utilizing each learning machine, the outputs from the learning machines are compared 107 to determine 109, by analytical methods, such as a majority vote or other well-known statistical methods, the label to associate with the email and thereupon label 109 the email. Thereafter the email under analysis again may be subjected to the process 101 to ascertain if another label fits the same email, since in some email, more than one class may apply, as by way of example, an email relating financial information to a legal interpretation of a tax matter.

Figure 1B:
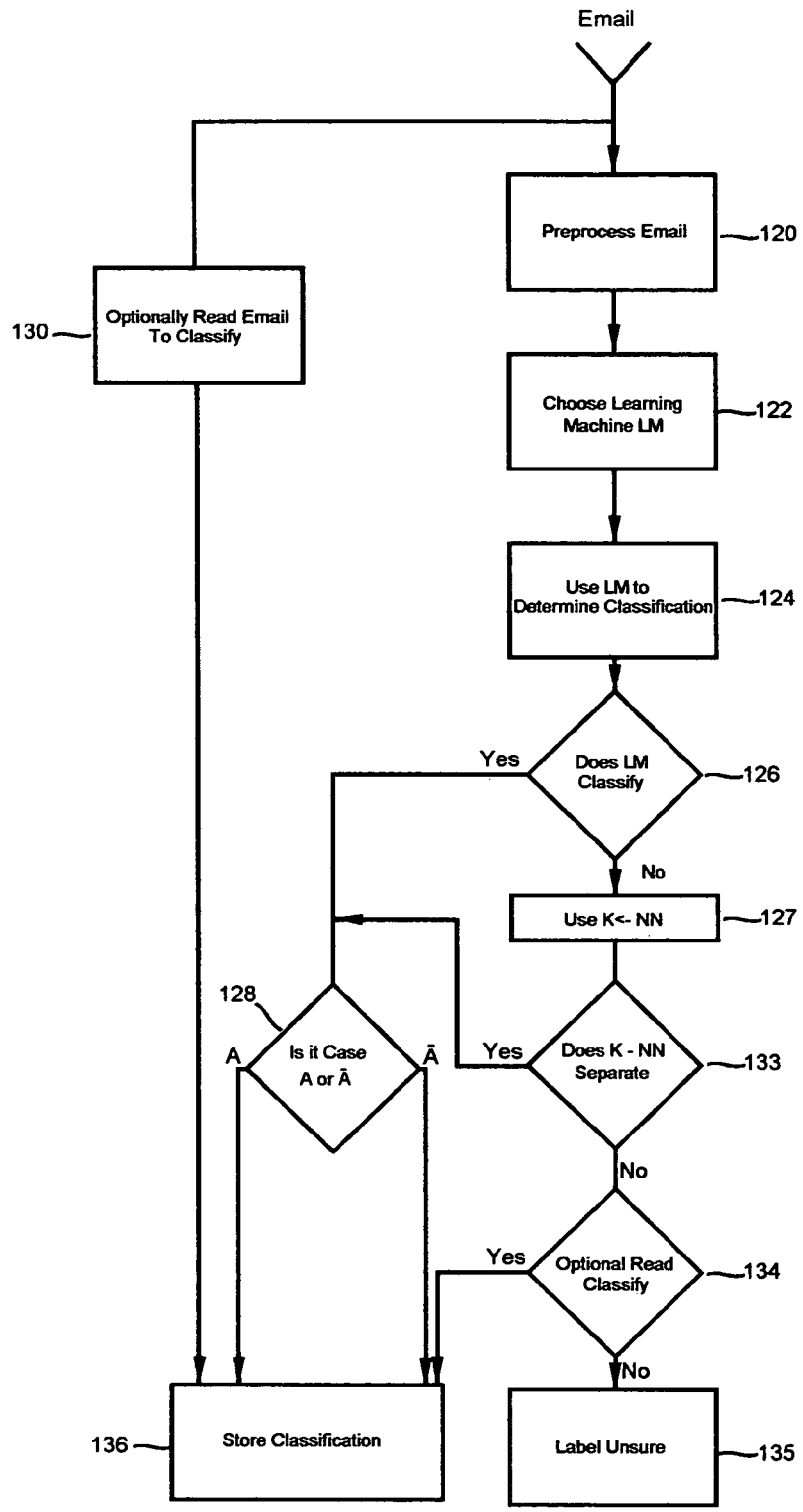
FIG. 1b shows a flow chart of a process employed to classify in the present invention.

In FIG. 1*b*, email received by a computer is optionally visually inspected 130 and classified 136 or according to the present invention is preprocessed 120 for purposes of utilizing its content as input to one or more learning machines. Since the art and science of learning machines evolve over time, the inventors do not limit the invention herein to a particular learning machine process. However, the learning machines disclosed by way of illustration and not limitation are processes within the class of processes well known in the art of pattern recognition such as a NN, a SVM and a NB. The method chooses 122 one of the foregoing learning machines to attempt a classification of the input email into a predefined class of emails. In step 124 utilizing one of the learning machines the inventive process produces certain outcomes such as identifying and classifying 126 the email as belonging to a predefined class or determining that the email classification is ambiguous and therefore falls into an unsure region. These regions are graphically depicted in FIG. 1*c* wherein email is clustered in either class A 138 or not A designated as class ~A 144. If as shown in FIG. 1*c* email is in the unsure region 144 then, K-NN 127 processes the classification. If the email is able to be labeled as decided by process 127 by at determination step 133, then it is further determined 128 as either class denoted by A or ~A and stored 136. If it is not able to be labeled, then the user is provided a decision option 134 of labeling the email and if the user decides 134 not to label the email, then the label "unsure" is provided at step 135. To summarize, machine-learning requires that text inputs are mapped into a vector space for doing analysis; each machine (in effect each label A) requires a training set for what qualifies as A and what qualifies as ~A. Typically 1,000 instances would be sufficient for email classifications. Once properly trained, the learning machine commences classification.

One embodiment of the present invention places email having similar properties into clusters. A uniform filter hash or a stackable hash can do the clustering for texts. Since the SVM prediction time is proportional to the number of support vectors, or the number of points in the unsure zone, prediction time can be reduced by grouping similar data points in the unsure zone into clusters, which can be represented by the center of the cluster.

Figure 1D:
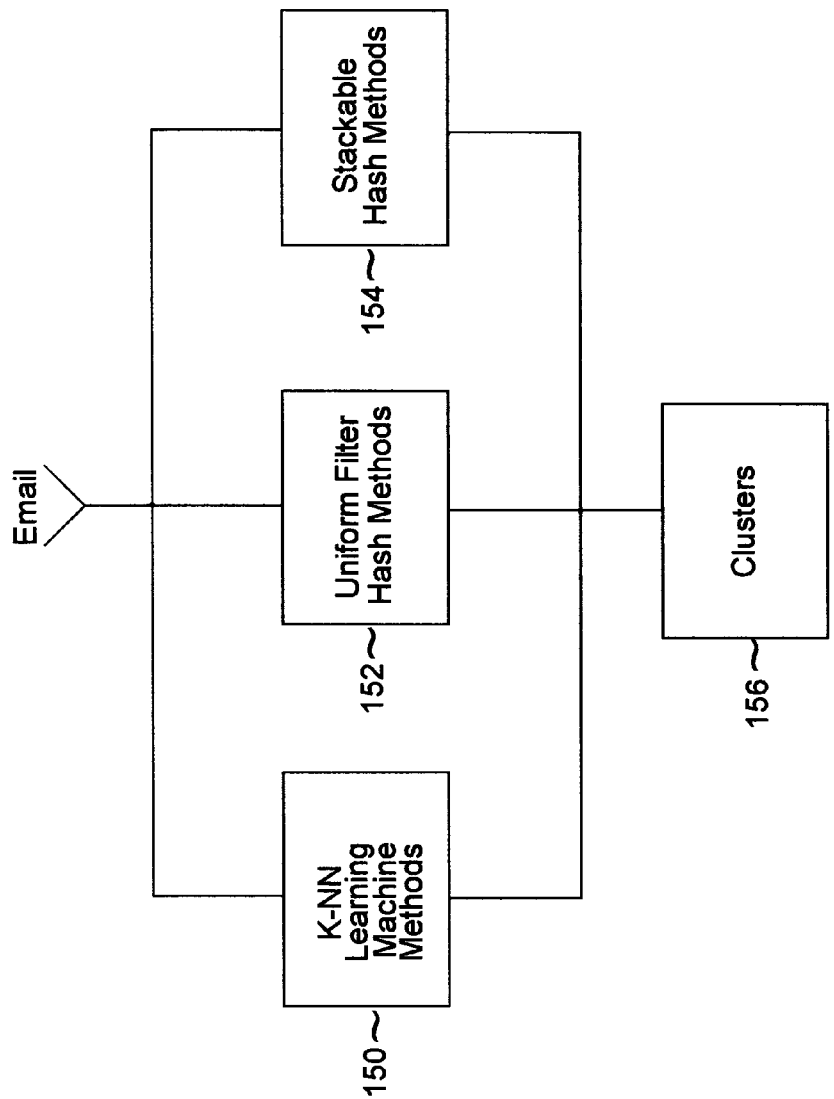
FIG. 1d shows a block diagram of the cluster methods of the present invention.
Figure 1E:
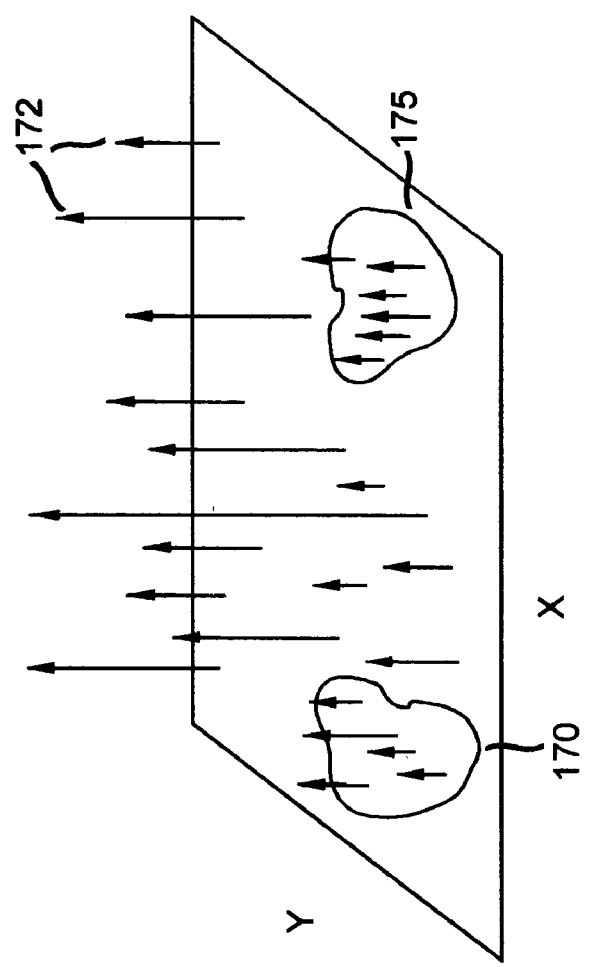
FIG. 1e shows a two dimensional array of accumulated document clusters.

The use of clustering methods follows the application of SVM, which is a global machine-learning method K-NN, and K-NN, which is a local machine-learning method. Clustering deals with the notion of cluster diameter and the distance between clusters or variants on this theme to effect separations. However, the present invention considers the method of forming a cluster novel as it relates to: (i) minimizing training/preprocessing time; (ii) minimizing computation time for classification; and (iii) maximizing accuracy of cluster discrimination. FIG. 1*d* illustrates an embodiment of the present invention whereby the email is subjected to methods that cluster the email rather than classify the email using one of several methods: K-NN machine learning, uniform filter hash methods and stackable hash methods. FIG. 1*e* graphically depicts a two dimensional space of cluster distributions where the respective positions of the clusters is based upon a similarity metric. A similarity metric may be, for example, a function of such properties as similar subject matter. (see, Vijayshankar Raman. Locality preserving dictionaries: theory & application to clustering in databases. In Proceedings of the eighteenth ACM symposium on Principles of database systems, pages 337-345. ACM Press, 1999.)

By way of example, the following email transcripts might be considered as belonging to the same cluster:

Looking For Mortg.age? You are already APPR.OVED by us!
Louking foR Mo.rtgage! You are already AproOVED by us.
LOOk-ing For M.o.rtg.age? U r alredy eppRO:ved by us . . .
LOOk-ing For Mo.rgage? Yo ar alreedy AppROO..ved by us;
Loking FOR M.o.rtg.age? yoo r alreaDY eppRO:ved by Us.
Loiking for Moortg.age? yo r alrady ap-proved by uS//
Leoking fr mortGAGE! You! ARE alrady ahpRO:ved by USS.
Loooking fr mo..rt;gage; yoU Re alRReady AppRO:ved by UUS!

If the available learning machine processes have been exhausted regarding classification or labeling, or alternatively the user decides simply to cluster 156 an email, then the inventive process proceeds to employ one of the clustering methods described in FIG. 1*d*. In step 150 a K-NN method is used. Alternatively, a method 152 of clustering email is based upon a uniform filter technology more fully described below. In method 154 a stackable hash forms the basis for a cluster process that receives email for purposes of placing the document under observation into a cluster of similar emails.

The uniform filter technology enables quick determination of which cluster is the mother cluster of an incoming email message. The stackable hash technology involves the creation of a geometric hash from an incoming email message. In one application the stackable hash technology enables quick determination of whether an incoming email message belongs to a cluster of recent history.

Uniform filters first compute a long hash consisting of ASCII characters. It is a characteristic property of the uniform filter that a small change in input is likely to cause each placeholder of the long hash output of the second hash to be different from the corresponding placeholder of the long hash output of the first hash. The useful property of the small hash methods is that all emails within a given cluster should in principle have the same small hash output.

Figure 1F:
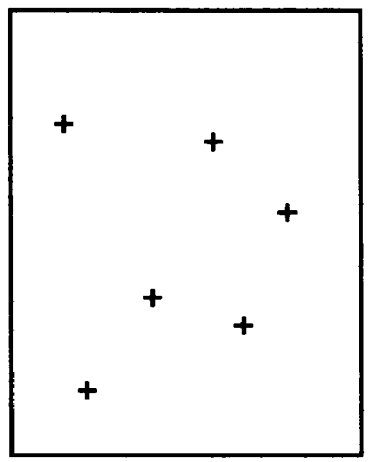
FIG. 1f shows email, shingling and a formed cluster of the present invention.
Figure 1F:
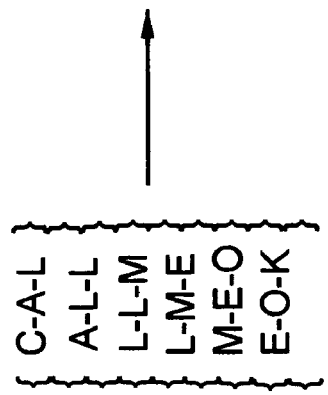
Figure 1F:
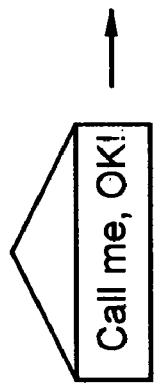

In FIG. 1f, the email having content "Call me, OK!" would after shingling produce stackable hash. The email is first preprocessing by removing the non-alphanumerics, then forming the "transition shingles" to which we then apply a proprietary "stackable hash" which maps each transition shingle into a single point inside the cluster represented by the square.

Figure 1G:
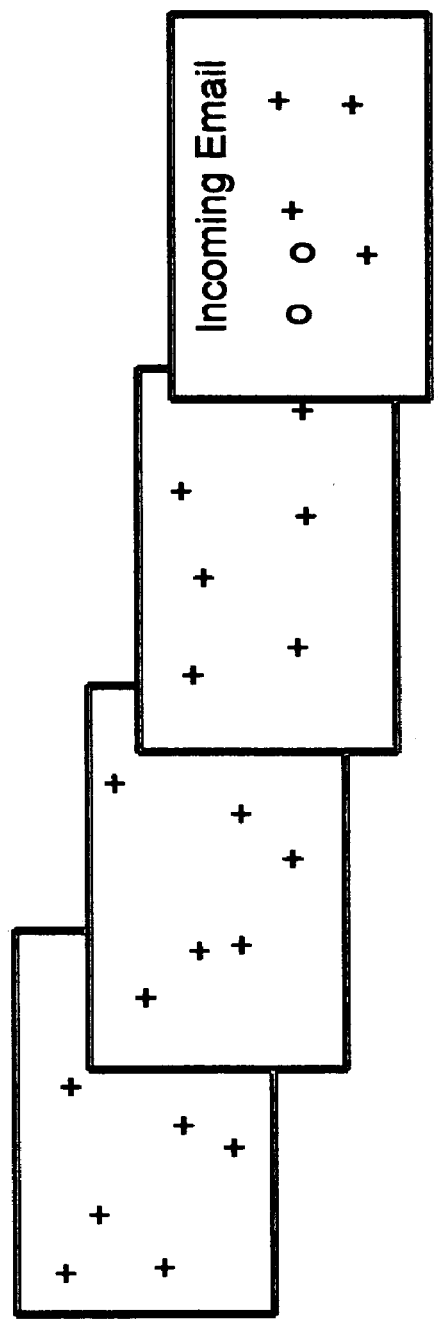
FIG. 1g shows an email cluster with frequently-occurring points in a stack.

As illustrated in FIG. 1g, it is a property of the stackable hash that the more points in the sheet of an incoming email message that match up to frequently-occurring points in a stack (i.e. a collection of sheets corresponding to recently-received input emails/documents), the more likely it is that that email message is part of a cluster. In FIG. 1g, points of a current sheet, which match up to frequently-occurring points in the stack, are denoted by an "o" symbol.

In practice, an email message typically consists of many more than six transition shingles as was illustrated in FIG. 1f. Furthermore, in practice the stackable hash method employs a lattice on the square of much greater resolution compared to what is depicted in FIG. 1f or FIG. 1g. In fact the choice of lattice combined with the parameterization of the stackable hash provide for an important property of the construction such that collisions are in practice unlikely.

Also in practice, those points in the lattice which correspond to frequently-occurring hashes as typical of the English language are removed. For example, using 3-transition shingles as above, the hash points corresponding to T-H-E, A-N-D, W-I-T, I-T-H, F-O-R while frequently-occurring in any stack, yield little information about whether an incoming email message actually bears meaningful similarity with the stack.

Figure 2A:
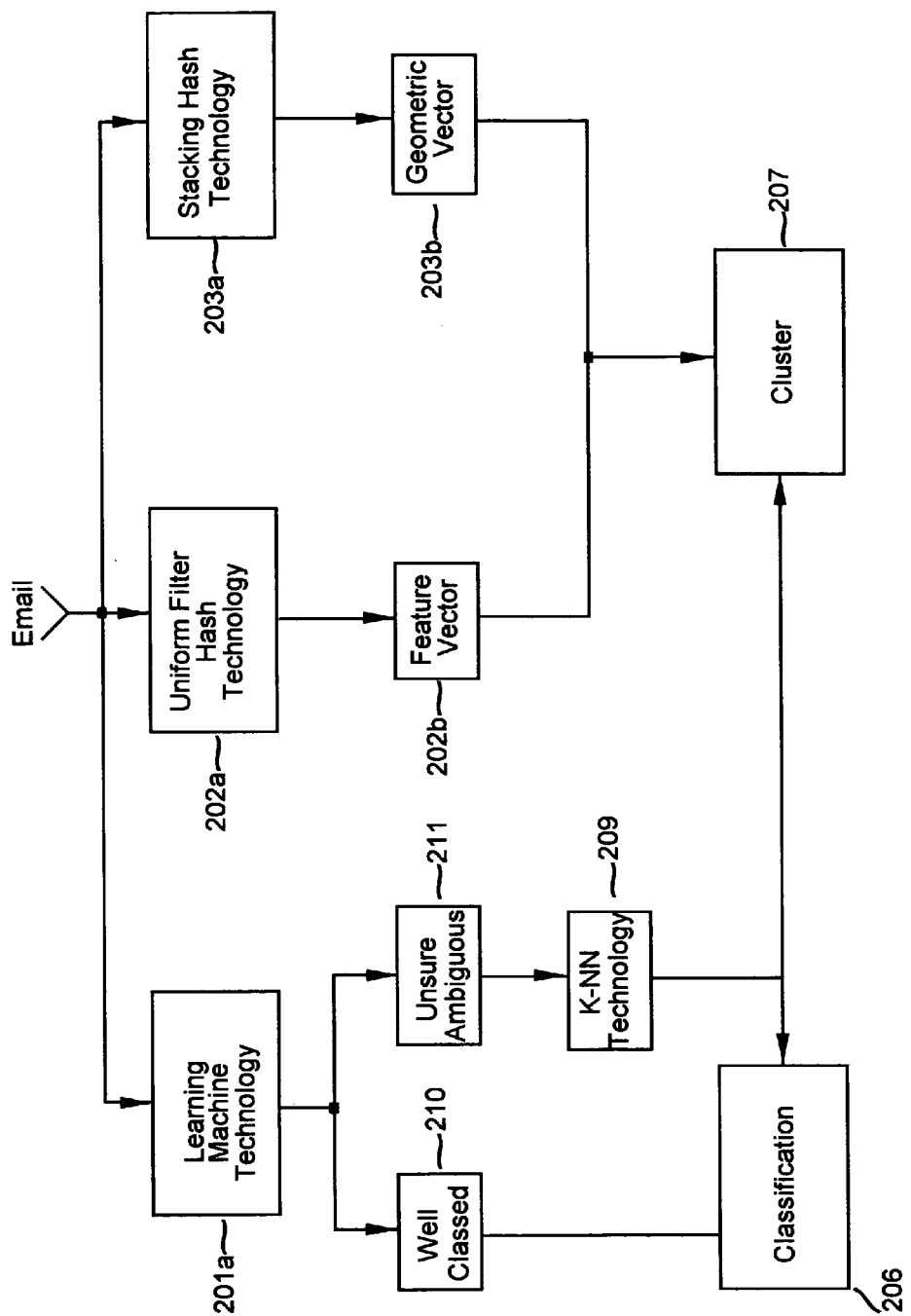
FIG. 2a shows a block diagram of the present invention.

FIG. 2a further illustrates an overview of the apparatus and method of the present invention. In block 201a, a learning machine technology and associated methodology receives email input into one or more learning machines as described in connection with FIGS. 1a and 1b, herein. The learning machine technology 201a produces output in the form of classifications that generally fall into two regions or categories: well classified 210 and unsure 211. Depending on the output from the learning machines 201a the system makes decisions as to what further processing steps are required such as to process the unsure 211 emails using the methods of K-MM technology 209. The further processing steps range from storing 206 the classification for future retrieval, utilizing the classification as a means to further improve the classification or alerting a user of the system to employ the result for administrative purpose, such as blocking spam.

In FIG. 2a, a uniform hash filter technology 202a is utilized to cluster electronic data patterns of the kind as described in connection with block 201a. Data is read into appropriate registers in the uniform hash filter technology 202a and produces a result referred to as a hash in the form of a feature vector 202b, which will be described in detail below. The further processing steps regarding hash range from storing 207 or placement of an email within a cluster for future retrieval. Other applications of the hash are to alert a user of the system to employ the result for administrative purpose, such as blocking documents having identified attributes.

In FIG. 2a, a stackable hash technology 203a is utilized to cluster electronic data patterns of the same kinds as described in connection with block 201a and 202a. Data is read into appropriate registers in the stackable hash technology 203a and produces a result referred to as stackable hash producing a geometric vector or hashing vector that is used to cluster the document, which will be described in detail below. The further processing steps regarding hash range from storing 207 the cluster for future retrieval, utilizing the means to further improve the clustering or alerting a user of the system to employ the result for administrative purpose, such as blocking documents having identified attributes.

The method of the present invention utilizes learning machine technology 201a in association with hashing technology 202a and the stackable hash technology 203a. The learning machines 201a found to be advantageous are well-known in the art of pattern recognition and as they pertain to this invention are categorized as: SVM, NB, and NN and K-NN nearest neighbor processes in respect to local machine learning. However, as indicated the learning machines 201a may not classify all types of electronic data streams adequately for a given application and therefore these methods are combined with other methods until a level of classification required by the particular application is achieved. Within the sphere of learning machine technology, supervised learning is a machine learning technique for creating a function from training data. The training data consists of pairs of input objects (typically vectors), and desired outputs. The output of the function can be a continuous value (called regression), or can predict a label of the input object (called classification). The task of the supervised learner is to predict the value of the function for any valid input object after having observed a relatively small number of training examples (i.e. pairs of input and target output). To achieve this, the learner must generalize from the observed or presented data to unobserved or unseen situations in a "logially reasonable" way.

The present invention employs boosting, which is related to logistic regression, maximum entropy methods. Boosting occurs in stages, by incrementally adding to the current learned function. At every stage, a weak learner (i.e., one that can have an accuracy as poor as or slightly better than chance) is trained with the data. The output of the weak learner is then added to the learned function, with some strength (proportional to how accurate the weak learner is). Then, the data is reweighted: examples that the current learned function get wrong are "boosted" in importance, so that future weak learners will attempt to fix the errors. The foregoing explains one of many different boosting methods and ultimately depend on the exact mathematical form of the strength and weight: e.g., boosting that performs gradient descent in function space; and boosting based on correct learning.

When more than one classifier is utilized the following steps used to effectuate labeling are: (1) training multiple classifiers using different or the same datasets; (2) randomly sampling from a larger training set, using the majority voting as a classifier; (3) using a set of different classifiers, each specialized at different zones (the well-classed regions and unsure regions).

The learning machines 201a are employed depending upon their ability to classify certain input types of electronic data patterns. In some instances it is contemplated that more than two classifiers might be employed simultaneously in analyzing an input. In such instances, a simple majority vote will determine the class of email. In other instances more complex analysis based upon a statistical or regression analysis might be employed. Furthermore by way of example, if one classifier, denoted A, is better than classifier B in a specific region such as defined by blocks, 210, and 211, then the system may be configured not to use a function of the quantitative result produced by the learning machines employed, but the categorical prediction from A alone. Alternatively, the system may employ all learning machines and if they differ in classification output, use a majority decision-making method to label the email. It is well-known that the SVM is a stable global classifier, and tends to function with greater accuracy than almost all other learning machine methods in a well-classed region such as well classed 210, when the regions are far from a separation plane. While in the unsure region 211, SVM might not be better than local methods employing K-NN. This is true particularly in cases where the dataset has complex local structure close to the separation plane. In such cases, the SVM has to use a very high order dimension of the kernel to handle the complex local structure, while the local method employing K-NN and neural networks might be better to resolve the local complexity. The combination of different classifiers is itself an expert system, which acts as a set of experts, each better at classification in a specific regime or region. In each region, a specific expert may be selected to do a particular classification.

From the above discussion, if we have two or more classifiers, each of which has a higher accuracy in some region than every other classifier, then the combination of the classifiers will improve the accuracy. However, the amount of accuracy boost may not be as high as required on certain datasets of email. By way of example, this may be because the difficult points for SVM in the unsure regions 211 are also difficult for other learning machine classifiers. It was found that the K-NN and neural networks can have an approximately 5%-10% better accuracy than SVM in the unsure region 211 and therefore the accuracy boost is from 3%-7%. It is anticipated that carefully choosing the parameters of the learning machine classifiers can achieve slightly higher accuracy boost.

Those skilled in the art of pattern recognition will understand support vector machines, which lead to excellent classification accuracies on a wide range of tasks, such as tasks relating to processing electronic data streams (see Scholkopf et al., Advances in Kernel Methods—Support Vector Learning, MIT Press, Cambridge, Mass., 1999; and Vapnik, The Nature of Statistical Learning Theory Statistical Learning Theory, Springer, N.Y. 1995.)

In one embodiment of the present invention, SVM algorithm for predicting multivariate outputs performs supervised learning by approximating a mapping h: X-->Y using labeled training examples $(x_1, y_1), \ldots, (x_n, y_n)$. The SVM of the present invention predicts complex objects y such as decision trees, sequences, or sets. Examples of problems with complex outputs are natural language parsing, sequence alignment in protein homology detection, and markov models for part-of-speech tagging.

SVM can be implemented as an application program interface for implementing different kinds of complex prediction algorithms. A multi-class classification learns to predict one of k mutually exclusive classes. However, if SVM is used to separate each class C and train with examples of what is C and what is ~C, then the inventors have discovered that it obviates the mutually exclusive condition.

In an alternate embodiment, a Naive-Bayes classifier classifies patterns based on the Bayes rule, approximations of the Bayes rule, or any other modification of the Bayes rule. Under the Bayes rule, attributes (such as a hash) are assumed to be conditionally independent by the classifier in determining a label (Spam, no Spam, tax return, no tax return). This conditional independence can be assumed to be a complete conditional independence. Alternatively, the complete conditional independence assumption can be relaxed to optimize classifier accuracy or further other design criteria Thus, a classifier includes, but is not limited to, a Naive-Bayes classifier assuming complete conditional independence. "Conditional probability" of each label value for a respective attribute value is the conditional probability that a random record chosen only from records with a given label value takes the attribute value. The "prior probability" of a label value is the proportion of records having the label value in the original data (training set). The "posterior probability" is the expected distribution of label values given the combination of selected attribute value(s).

Figure 2B:
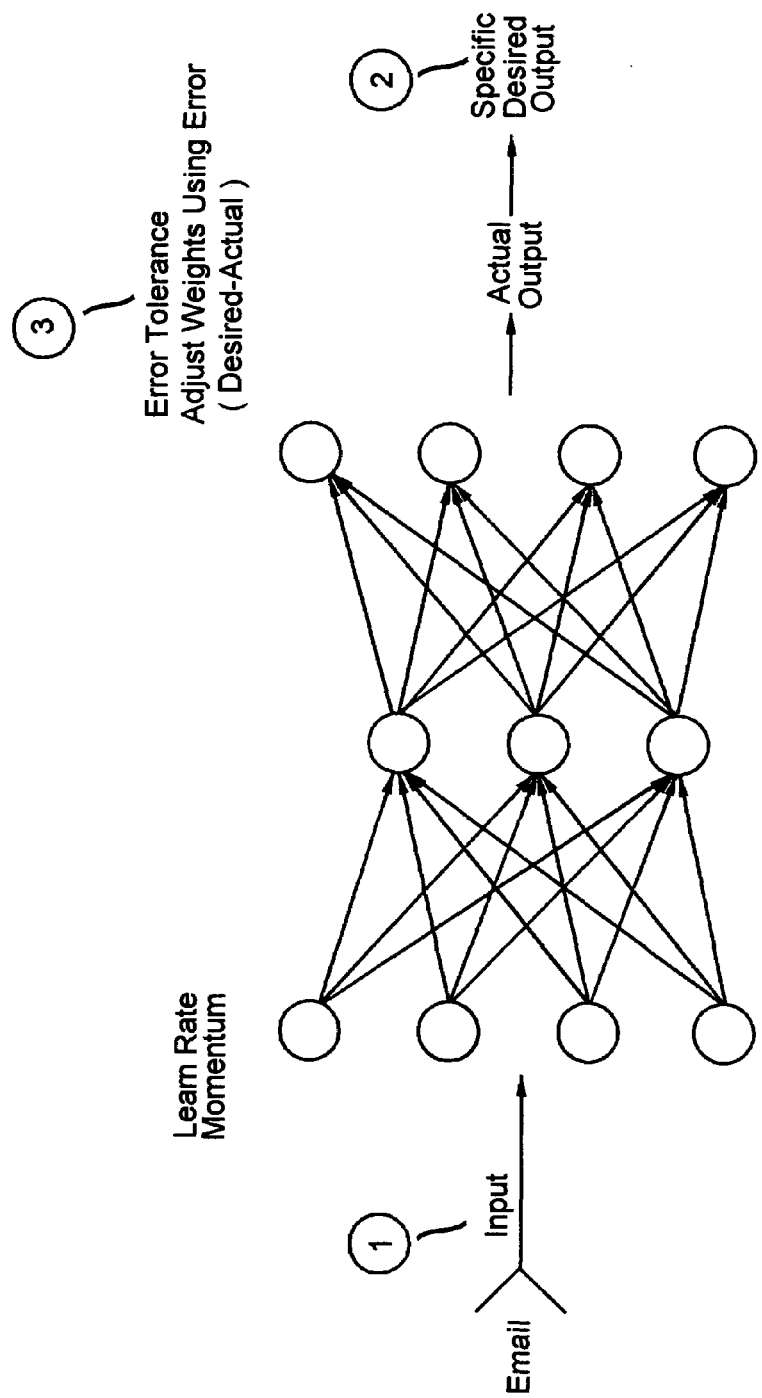
FIG. 2b shows a diagram of a feature of a learning machine of the present invention.
Figure 2C:
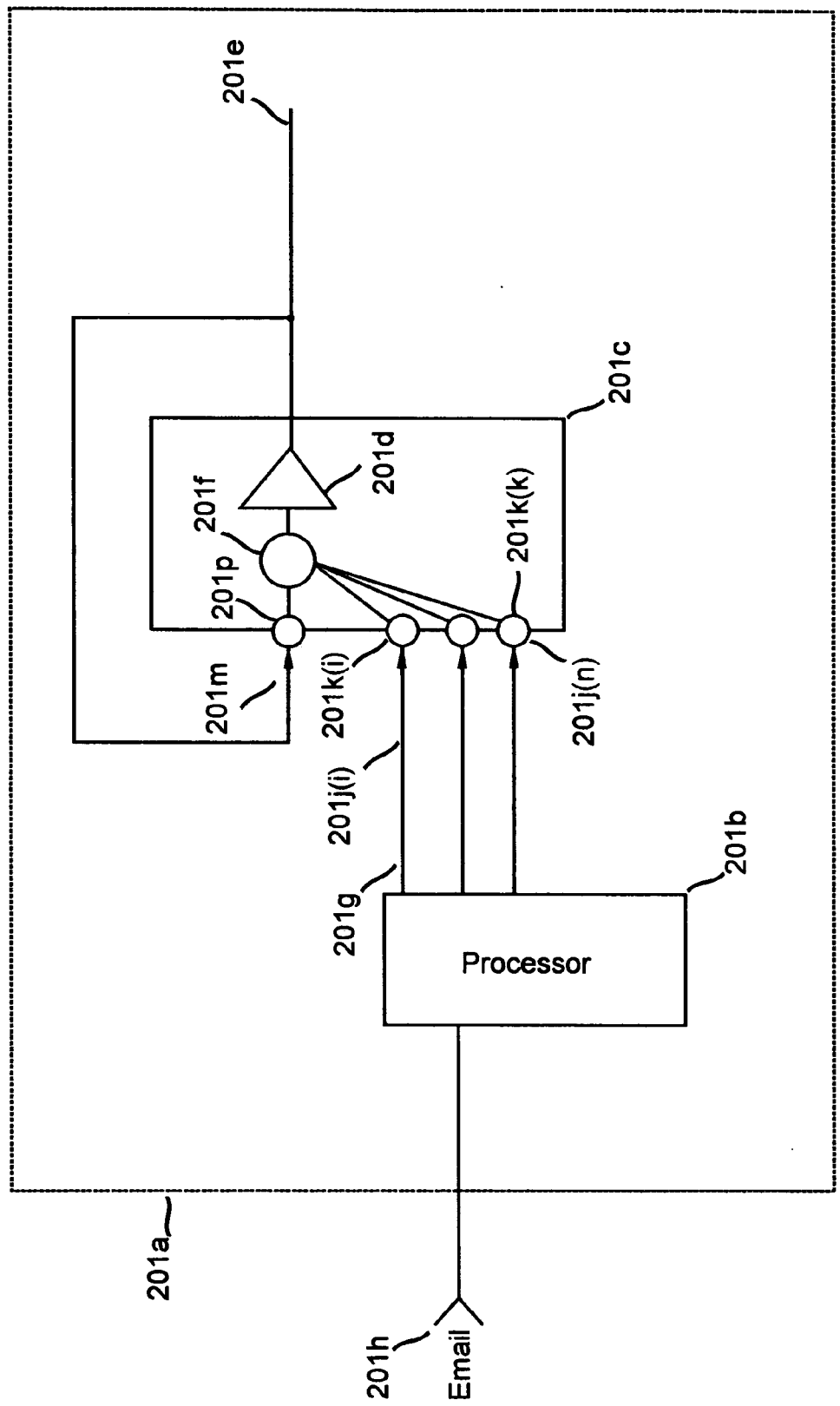
FIG. 2c shows a diagram of a learning machine of the present invention.

FIG. 2b and FIG. 2c illustrate a learning machine 201a configured to model algorithms to classify, categorize and weigh data indicative of two or more classes of electronic data patterns such as email or constructs thereof as described herein. The classifier categorizes and weighs data representative of a first input 201h which is preprocessed so as to convert the email into a form such as a vector suitable for input to the active component 201c of the network Those skilled in the art of learning machine science and engineering know of many methods to trained networks, but the one illustrated herein is referred to as back propagation. Referring to FIG. 2a, the network takes the vectors of electronic data streams in step 1 and feeds it through the system, evaluating the output at step 2. It then changes the weights in step 3 in order to get a more accurate output. It continues to run the inputs through the network multiple times until the error between its output and the output you gave it is below a defined tolerance level. After training is completed, the neural network is presented with email representations it has not been exposed to before. It then predicts a classification based on the weights it created during training.

One embodiment of a network of the present invention is shown in FIG. 2c detailing one element of a network that employs modeling algorithms to classify, categorize and weigh data indicative of two or more classes of electronic data patterns such as email or constructs thereof, such as hash as described herein. As shown in FIG. 2c, back propagation consists of three steps. A vector 201g of email 201h character values, is assembled by processor 201b and presented to the input layer 201j of a learning machine 201a. The inputs 201j are propagated through a network 201c until they reach the output 201e. This produces the actual or predicted output pattern. The actual network outputs are subtracted from the desired outputs producing an error signal. The errors are passed back through the network by computing the contribution of each hidden processing unit and deriving the weighted adjustment producing the desired output. Adding a single additional layer can transform the otherwise linear neural network into a nonlinear one, capable of performing multivariate logistic regression.

One example of a classifier categorizes and weighs data representative of a first input 201j(1) and one or more additional inputs 201j (n). During a training phase and an execution phase respectively, each input 201j (1) and one or more additional inputs 201j (n) are multiplied by a pre-assigned weight, 201k (1) and one or more additional inputs 201k (n) respectively. At the summing junction 201f, the data forms a difference, referred to as a weighted difference, between each input 201j (1) and one or more additional inputs 201j (n) as well as input from weight 201m. A plurality of such weighted differences are summed in a processor 201d having a sigmoid transfer function such that when the output 201e is back propagated at 201m, the weighted difference generates a minimization at the node 201f. Essentially, the processor 201c operates to calculate the weighted sum of one or more inputs representing levels of two distinct electronic data patterns such as email or constructs thereof, such as hash. More particularly, training emails 201h et(t) with known characteristics are fed into weighing nodes $201k(1)$ and one or more additional nodes $201k(n)$ so that the output eo (t) $201e$ is fed back to $201m$ and adjusts $201p$ such that node $201f$ forces the output of the processor eo (t) $201e$ to zero. In that way the processor $201d$ (usually a sigmoid function) zeros out by setting the weight $201m$ and in turn node $201f$ appropriately. When an unknown email $201h$ eu(t) is fed into $201j$ (1) and one or more additional inputs $201j$ (n), the output eo (t) $201e$ is: $\Sigma_{all\ n}$ ($W_{201j(n)}$*eu(t)+$W_{201m}$*eo(t)+Kb>0 where $W_{201j(n)}$ corresponds to the input weighing nodes $201j$ (1) through $201j$ (n) and where $W_{201m}$ corresponds to weighing nodes $201m$ for two distinct electronic data patterns such as email or constructs thereof. A constant K can be used as a threshold.

Clusters consist of near identical objects. As indicated in FIG. 2a, the method of the K-NN process of the present invention determines where a cluster is located. This method employs a supervised classification rule for non-parametric supervised pattern classification. Given the knowledge of known patterns within a cluster of an email variety, which for purposes of analysis has been reduced to vectors of dimension m, and their correct classification into several classes, the K-NN rule assigns an a priori (unclassified pattern) to the class that is most heavily represented among its k nearest neighbors in some relevant space, such as might exist in a cluster of unsure or ambiguous points following an unsuccessful classification by a learning network. Notably, when the number of training samples is large enough compared to k, the classification error will typically be (1+1/k) times larger than the Bayes risk which characterizes the overlap of the different classes in the space of interest. The K-NN method is well known as a pattern classification technique by those who are skilled in the art of pattern recognition (see, Buttrey (1998): Buttrey, S. E., "Nearest-Neighbor Classification with Categorical Variables," *Computational Statistics and Data Analysis*, Vol. 28, No. 2, (1998), pp. 157-169.) The idea behind K-NN processing is that similar observations regarding electronic data patterns such as email belong to similar clusters.

The methods of K-NN can be used for both document classification and document clustering. In the former application the classification tasks require pre-defined classes that necessitate labeled or identified training documents. In the latter case, i.e. clustering requires no pre-defined classes. The objective is to determine similarity-based grouping of objects such as utilized in clustering documents.

Other well known similarity measures include Cosine distance or Euclidean distance, Jaccard coefficients or containment coefficients, among others. The text being classified is assigned the most common class among its k nearest neighbors, such that when k=1, the text under observation is assigned the class of the a priori samples closest to it as defined by the measure of similarity.

The method of K-NN cluster classification of the present invention comprises the following steps: (a) defining a metric to measure "similarity between any two documents; (b) establishing the constant k based upon experiment; (c) observing samples under observation; (e) a training set of pre-classified points; (f) locating the k nearest neighbors (K-NN) to data x closest to the training set; (g) classifying data x as class y if more of the nearest neighbors are in the class y than in any other class.

Hash Technology

Stackable Hash

The clustering methods used herein are for the purpose of clarifying the membership of "borderline" or "unsure" points in this embodiment. While typical clustering methods are designed with the purpose of minimizing cluster separation, cluster radius and related quantities; the use of the hash methods as described permit further indexing solutions. FIG. 2a shows the stackable hash technology $203a$ which places a document into some cluster rather than to identify the particular cluster to which it is a member. The classifier $203a$ reads each record consisting of 256 8-bit bytes as a discrete portion of an electronic data stream. The electronic data stream, is typically partitioned into individual overlapping and 8-bit byte shingles. The overlapping shingles are then provided to the classifier $203a$, which is configured or programmed to ascertain whether a particular electronic data stream contains an object or pattern of interest such as spam (although it is to be appreciated, that the classifier can be used to detect other objects or patterns). For each electronic data stream, the system determines whether the electronic data stream corresponds to a pattern such as spam. To provide the classification output, each electronic data stream has to be evaluated relative to a "space" that defines what is or is not a document having identified attributes.

Figure 2D:
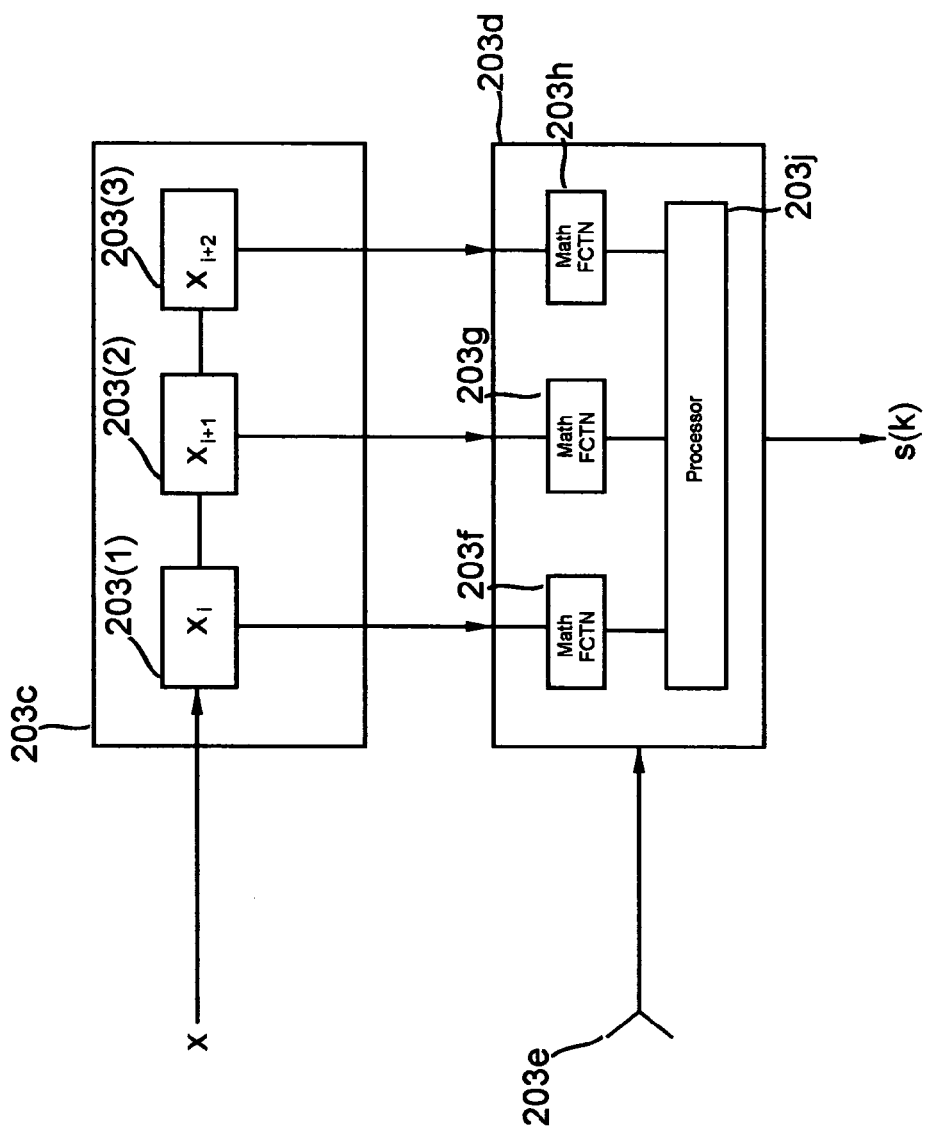
FIG. 2d shows a diagram of a stackable hash means of the present invention.

As shown in FIG. 2d, one embodiment of the present invention also includes an optional "stackable hash" S(k), which allows for the creation of a stackable hash cluster. In FIG. 2d, an electronic data stream X in the form of 8-bit byte ASCII characters designated variously as data $x_i$, $x_{i+1}$ ... $x_{i+n}$ as may be found in a typical e-mail transmission having n characters is received as input into one or more discrete input data registers $203c$.

The technique of using adjacent data elements and shifting or moving the data elements $X\epsilon\{x\}$ one position or byte is referred to as shingling, and is a technique found in the prior art. These shingles essentially form the most basic element of local analysis of text strings. Every email document consists of a set of subsequences of tokens referred to herein as a shingle such that by way of example, characters "a and b" form a 2-shingle and "a, b, and c" form a 3-shingle, etc. As illustrated in FIG. 2d, data is received serially into an input register $203c$ having data elements $203$ (1), $203(2)$, and $203$ (3) representing the information content of a document having an electronic document electronic data stream X $203b$ which can associate a set of overlapping data as for example, a 3-shingling of:

(abc, cde, def, aef, der, abf)

{(abc, cde, def), (cde, def, aef), (aef, der, abf),)}.

In one embodiment of the present invention the mathematical function provided by a calculator $203d$ is configured to accept three adjacent 8-bit characters. From these data the required numerical result is calculated. The data $x_i$, $x_{i+1}$ and $x_{i+2}$ provides input to a calculator $203d$ configured to provide a mathematical function $S_k$, which produces a numerical result S(k), alternatively referred to as a hash value or geometric hashing vector. It should be noted that a basic concept in all hashing methods is that they associate hash values to shingles, in the case as herein described of the stackable hash they associate hash values to transition-shingles; in the case of other methods they associate hash values to other units of decomposition such as super-shingles or other related constructions.

A hash output is formed from the input $x_i$ $x_{i+1}$, and $x_{i+2}$, where i=1. Upon having calculated the numerical result, a new trio of adjacent data elements $x_{i+1}$, $x_{i+2}$ and $x_{i+3}$ are loaded into the data register $203c$. The new data elements, $x_{i+1}$ $x_{i+2}$ and $x_{i+3}$ are then utilized as input to an arithmetic logic unit $203d$ and mathematical functions $203f$, $203g$ and $203h$ to produce shingling as input to a mathematical processor $203j$ having the additional optional parameter as input $203e$, typically a prime number to form the geometric vector result $S_k$.

The particular mathematical function is determined by the formula or algorithm, chosen to operate on the inputs and in some instances one or more optional parameter 203e such as a random variable R chosen for calculating the numerical results, or a prime number to reduce the size of the major hash table. Shingling is not a requirement of the invention inasmuch as other ways of forming the operands $x_i$ and $x_{i+1}$, $x_{i+2}$ . . . $x_{i+n}$, from a data source $\{x\} \in X$ are found to be gainfully employed. Notably, the method of selection of mathematical functions $S_k$ as described herein in conjunction with the shingle (or shingling) technique, as described is novel.

In general, the calculator 203d producing $S_k$ of the present invention produces a character string of variable length; however, in one embodiment, output S (k) is a number in the range 0 to 255 or alternatively 1 to 256. Pairs of calculations S(k) result in a pair of Cartesian coordinates in an x-y plane. Each x, y entry in the plane is expressed as a unit value, essentially creating a two dimensional histogram of points. The amplitude of the histogram is characterized as the frequency of occurrence of a particular 3-ary shingle.

The stackable hash method disclosed comprises the steps of: (a) receiving a plurality of hashing vectors from a set of documents and storing said sample hashing vectors into a random access memory; (b) loading a data register with at least two adjacent data elements from a received document; (d) computing an email hashing vector utilizing a hash means; (e) and comparing the email hashing vector with the plurality of sampled hashing vectors.

Creating a stackable hash is important from the point of view that it is not necessary to search a hash space to find fraternal members of a cluster. As illustrated in FIG. 1e, one embodiment of the present invention forms a multiplicity of email documents, shingled as described, the results of which form a composite histogram. The number of email documents forming the composite can vary from one to any arbitrary number; however, it has been found that an aging process can accomplish stabilizing the growth of the histogram, where the oldest document is removed from the accumulation. However, other criteria may be employed, such as casting out documents that may not contribute to an overall labeling objective, as for instance, a document that does not contribute any information because it contains only one character in its entirety.

Visualization of document collections, is generally based on clustering or a proprietary space conversion technique focusing on a collection of documents, (see, U.S. Pat. Ser. No. 5,794,178, entitled "Visualization of information using graphical representations of context vector based relationships and attributes", filed Aug. 11, 1998, which generates context vectors representing conceptual relationships among items, and further facilitates comprehension and use of textual information using visual and graphical representations).

The stackable hash feature as shown in FIG. 1d and FIG. 2a has as its objective, capturing clusters "bursted" in real-time. Furthermore, the histogram as depicted by FIG. 1e serves a useful function whereby identification of classes of documents is made on the basis of the statistics contained in the histograms. Many of the techniques such as means and variance tests are applicable; however, the inventors have found that one or more thresholds of amplitudes serves to at least identify a large number of disparate classes of email "bursted" in real-time.

FIG. 1e illustrates one or more arrows 172 that indicate significant clusters of calculated shingles forming sub distributions such as sub distributions 170, 175 in the larger x-y plane. A method of the present invention utilizes a low-collision hash on a sufficiently high-resolution lattice on the square. By way of explanation and not limitation, consider that the x-y plane in FIG. 1e is defined by a 997 by 997 rectangular lattice. For example take the input S-E-T-H. The 2-shingles are SE, ET, and TH. But there are only two transition-shingles: SE→ET and ET→TH. As a result, the output matrix will only contain two hash entries. As characters, these 2-shingles command 65,536 bits of storage each. This may not be practical. It is generally more efficient to take the integer representation of S-E and identify it with its equivalence class (modulo P), where P is a reasonably large prime number. For purposes of the present invention, take P=997; which empirically has been found to associate minimal probability of collisions. As a result, the matrix the present invention utilizes in one embodiment is of size 997 by 997.

If we have a run of shingle 123456->234567, then we can hash them into smaller sizes by a prime number, say 997, then the hash of the above shingle run becomes 825→272 a number divided by prime and whereby the remainder is fit into the smaller 2-D table. Using a prime number other than non prime (i.e. composite) numbers such as $2^8$ or $10^3$ can reduce the probability of the clustering of the hashed values. i.e., the hashed values tend to distribute randomly evenly in the table.

As a simple example consider a Hex number: 0x??00% 0x0100 (or $2^{\wedge}8$)=0. In this case the value of ?? has no consequential effect since changing the first character doesn't change the hashed value. Furthermore, the probability of collisions is very high.

The stackable hash feature of the present invention has the following properties, which distinguishes it from other hashing functions: (a) the hashing code is represented by a large matrix, which has sparse non-zero entries; (b) each entry in the hash (i.e. entry in the matrix) represents some encoded local information somewhere in the text message; (c) the number of overlapped non-zero entries is small in probability, if the two text messages are irrelevant, but is high if they share some similarity; (d) by stacking the hashes of multiple documents or messages, the hash entries corresponding to the shared text segments, or the similar text segments, will be highlighted.

The building of a peak in the histogram has the effect of associating a "brightness" function which grows in value as the amount of overlap in shingling occurs. The brightness function also declines in value as time passes; thus incorporating an "aging" function.

In the following embodiment, the stackable hash feature of the present invention is implemented in a well-known source code to further illustrate the reduction in the size of the matrix by dividing by a prime number:

function [deg1, deg2]=similarity(s1, s2)
% FUNCTION [deg1, deg2]=SIMILARITY(s1, s2)
% Purpose: Compare the similarity of two strings
%
% Input:
% s1—string1
% s2—string2
% Output:
% deg1—upper value of similarity
% deg2—lower value of similarity
% number of bytes as group
bytes=3;
P=997; % a large prime number for hashing
M=zeros(P,P); % create an empty two-dimension transition graph
len1=length(s1);
len2=length(s2);

```
% swap the long string to the first
if(len2>len1)
    temp=s1;
    s1=s2;
    s2=temp;
    temp=len1;
    len1=len2;
    len2=temp;
end
% create graph
for i=1:len1-3
    d=double(s1(i:i+3))+1;
    x=rem(d(1)*256+d(2), P)+1;
    y=rem(d(3)*256+d(4), P)+1;
    M(x,y)=M(x,y)+1;
end
% compare string
common=0;
for i=1:len2-3
    d=double(s2(i:i+3))+1;
    x=rem(d(1)*256+d(2), P)+1;
    y=rem(d(3)*256+d(4), P)+1;
    if(M(x,y)>0)
        common=common+1;
    end
end
deg1=common/max([1, len1-3, len2-3]);
deg2=common/max(1, min(len1-3, len2-3));
return
```

Figure 1H:
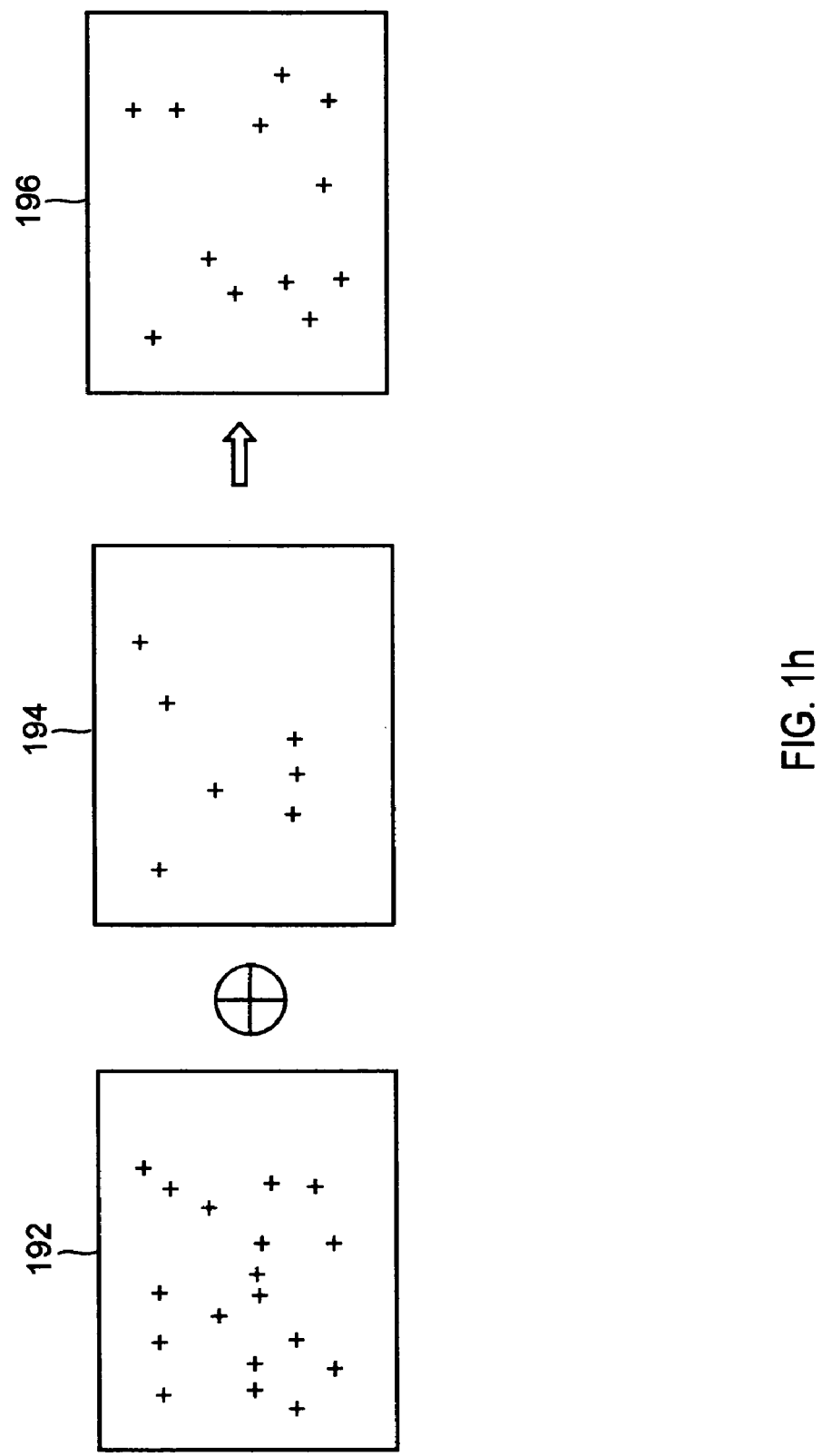
FIG. 1h shows an incoming email as clustered, logically intersected with a cleansing mask to produce a cleansed email cluster.

The computer method for creating an accumulation of documents stored as a cluster further includes the creation of a mask which compares clusters to an n-dimensional matrix of thresholds for purposes of identifying document clusters. In two dimensions as illustrated in FIG. 1e, the matrix as illustrated in FIG. 1h is a two dimensional bit pattern of binary values suitable for creating the intersection of the mask and a two dimensional cluster of related documents. Incoming email as clustered 192 can be logically intersected with a cleansing mask 194 to produce a cleansed email cluster 196. In higher dimensions of cluster space, several masks numbering on the order of the cluster space can pair-wise form intersection with the relevant space.

The present invention utilizing a stackable hash includes a computer method for detecting a document having identified attributes comprising: (a) converting a binary coded message into numeric values; (b) computing a vector based upon the numeric values provided to a mathematical function; (c) comparing a difference between the value of the hashing vector and to a stored vector.

The present invention utilizing a stackable hash also includes an apparatus for detecting a message comprising: (a) a means to convert a binary coded message into a set of numeric values; (b) a means to compute a hashing vector based upon the numeric values provided to a mathematical function; (c) a means to compare a difference between the value of the hash vector to a stored vector or digest representing the stored vector; (d) a means to append a header to a spam message based upon the comparison.

Uniform Filters Method

For purposes of clustering email into similar classifications one embodiment of the present invention invokes a method of: (i) small hash threshold; (ii) small hash length; (iii) small hash average; (iv) number of emails to check; and (v) choice of database/sub-corpus; (vi) choice of long hash threshold. These processes are further described below.

The uniform filter technology utilized in the present invention provides a continuous function such that it is computationally possible that two messages having similar message digests can produce the same feature vector value. However, it is not computationally possible to produce any arbitrary message having a given pre-specified target message digest. The uniform filter requires relatively little computational overhead as compared with competing schemes, because as will be apparent below, only a small number of initialized sampling functions are required to satisfy the requirements for matrix lookup and addition operations. Additionally, they can be coded efficiently and will be useful to a large number of applications beyond the identification and management of spam.

The hash technology of the present invention represents innovation in the field of fuzzy, locality preserving, and locality-sensitive hashes. As such the hash technology of the present invention determines exact and approximate distances between objects in a static or dynamic database. Searching hash technology hash space is much faster than searching the original database. One aspect of the present invention produces a feature vector as messages are received by a server computer configured to receive email messages in any type of protocol, such as SMTP. Although the present invention utilizes, by way of example, a method and apparatus for detecting spam, other applications will be possible by varying the parameters of the uniform filters. By way of example and not limitation, the present invention will permit: (1) text clustering such as agriculture-mathematics-politics and technology; (2) image clustering to find digital photographs similar to a chosen template image in an archive of hundreds of millions of photographs; and (3) sound clustering to identify digital sound/music files in a similar way.

The present invention creates message hashes or hashing vectors computed by continuous functions produced by uniform filters operating on email to construct feature vectors, which do not change significantly when the message changes slightly. In one embodiment, email feature vectors are stored in memory as templates to compare future email feature vectors. Through experimentation and analysis the inventors have found that documents having identified attributes will share similar or equivalent feature vectors within some margin of error.

The invention herein comprises a computer method and a system, which utilizes a uniform filter to generate a feature vector to create a digest of emails relative to categories. Thereafter, a filter having the identical characteristics as the digest generating filter creates a feature vector of emails in order to classify them by comparison to the digest. In one embodiment, the inventive method compares two sets of feature vectors by comparing the distance thresholds that separate them, thereby generating positive incoming message identifications (such as may be represented by spam) that fall within the numerical range defined by the thresholds. The higher the threshold the more probable it is for messages to be considered as similar. If the threshold equals 255, all messages will be considered similar. On the other hand, a threshold equaling 0 will select only identical emails. A threshold of 13 has been found an optimal value for discriminating email.

In one embodiment, a computer system utilizes a sendmail and filter protocol for the purpose of enabling on-the-fly performance of filtering spam in a real-time environment.

Figure 3A:
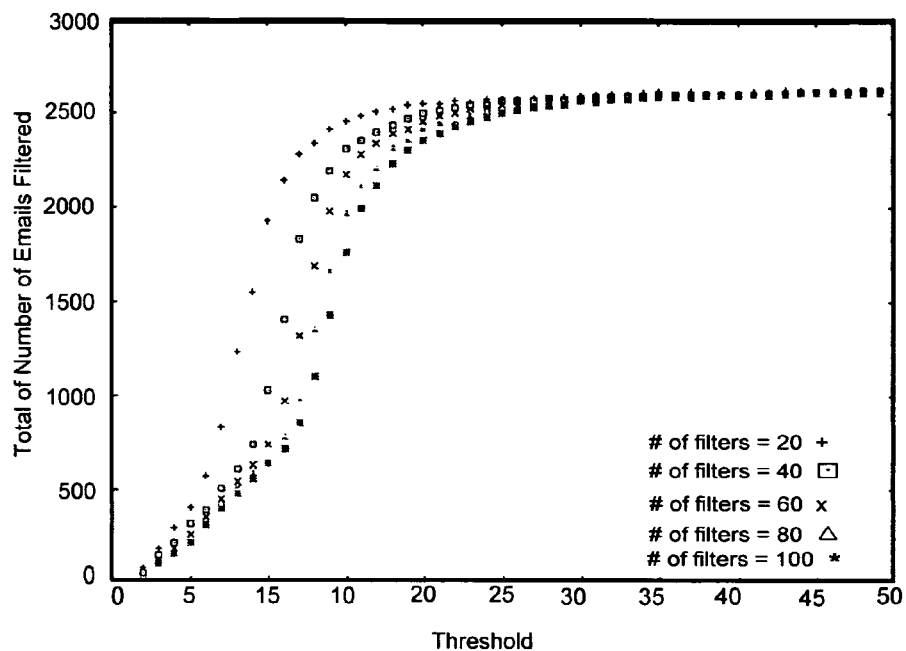
FIG. 3a represents spam classes as a function of threshold plotted at several filter values.
Figure 3B:
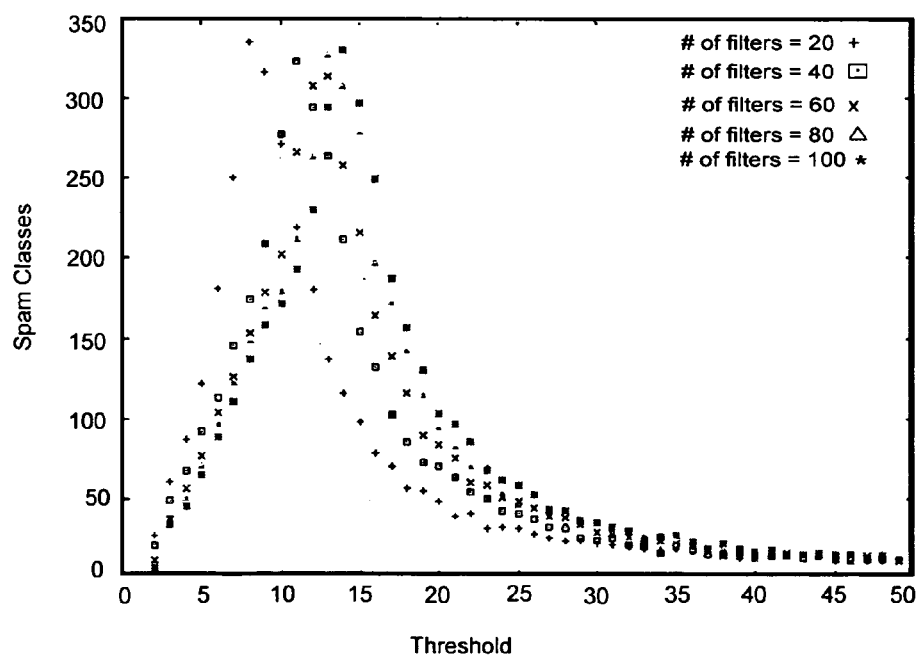
FIG. 3b shows optimal threshold values as a function of spam classes.

By way of overview, FIG. 3a represents the total number of emails as a function of a threshold plotted for increasing numbers of filters. The plot demonstrates that as the number of filters increases, the function approaches a universal function. FIG. 3b plots the relative frequency of spam classes utilizing a range of thresholds. The mode of the relative frequency distribution indicates a strong resonance in the universal function occurring at a threshold of approximately 13. In particular, the inventors observed that the optimal threshold as seen from FIG. 3b is much smaller than 255. One important feature realized in the multi-filter set is that of the property of universality. Although it might appear that using as many filters as possible produces the most reliable filtering, the inventors have found that 100 filters provide a sufficient degree of filtering for recognizing a spam class of emails, providing the emails are typically on the order of 200 characters long. Other classes of emails and other length emails may accordingly require more or less than 100 filters to provide a requisite degree of filtering for a particular application.

In general the inventive process receives email content in the form of data elements, which comprises the body of an email. In an email transmission the data elements represent control characters or informational characters. In the preferred embodiment, the control characters such as HTML tags that are stripped from the message and throughout this specification, unless otherwise stated, in reference to the message will mean only the informational characters.

A set of filters is defined as uniform if all of the filters are structurally equivalent in a computational sense. A trivial example of uniform filters is a set of identical filters where the output state is determined for a given input state operated on by fixed parameters. Another example of uniform filters is a set of filters where the output state is a function of a matrix of transition probabilities. In the invention to be further described herein, a matrix of randomly chosen numbers is produced by the same random function that produces the filter, where filters differ from one another by a seed used for the initialization of the random function. As a consequence of being equivalent, all filters would employ the same optimal thresholds when used as stand-alone filters. This fact simplifies the optimization problem. As a result of utilizing a uniform filter approach as an essential element, various functions of threshold are made tractable, which under non uniform filter technology would be extremely difficult even in numbers as few as 50 filters. A difference exists between using each of the filters separately and using the filters as an ensemble. In the first case, each of the filters has a threshold, which in the case of a uniform filter set, is the same for each filter.

Figure 3C:
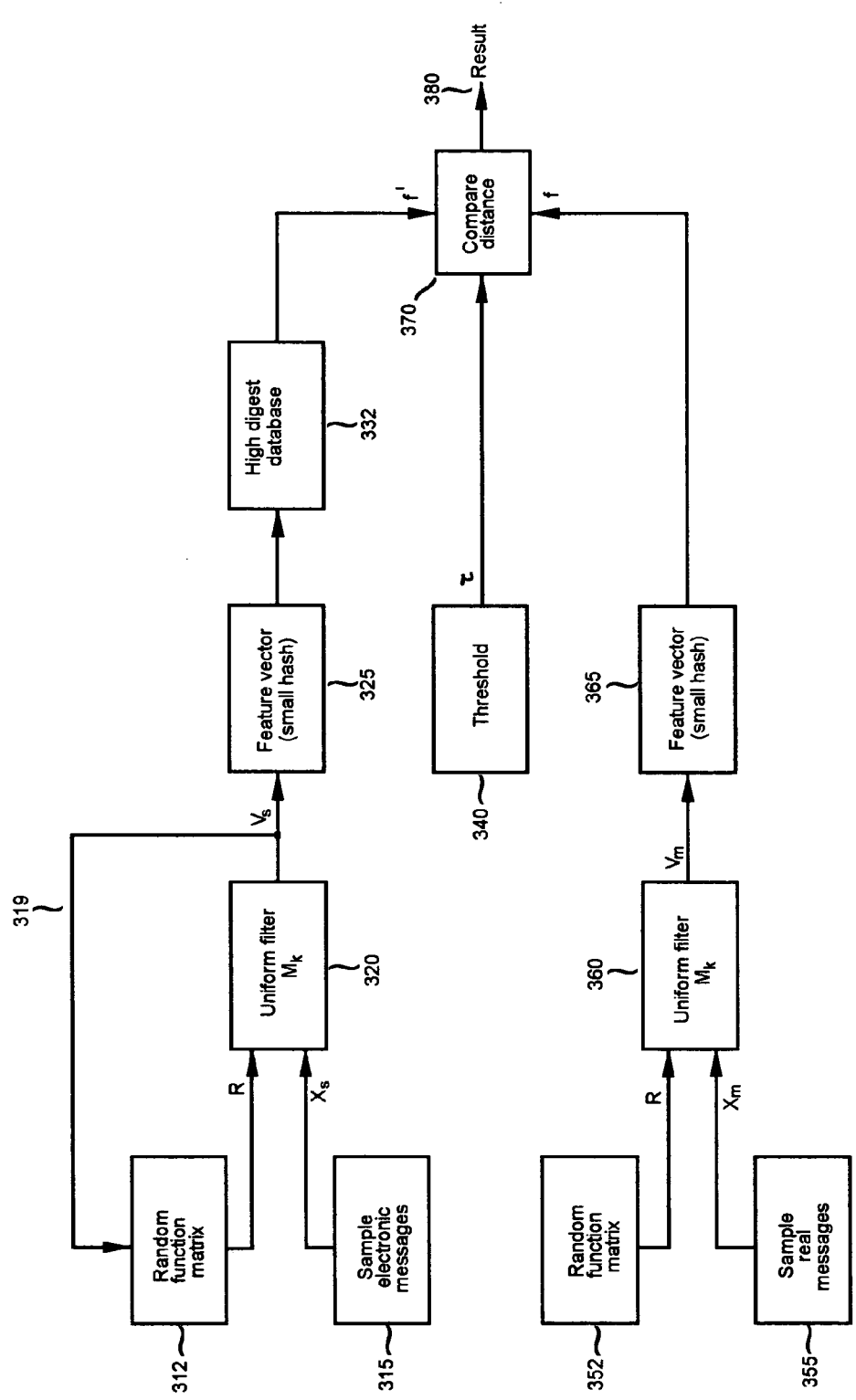
FIG. 3c shows a block diagram of the process of forming a hash.

Referring to FIG. 3c, a method of the present invention creates a matrix of random numbers 312, as further explained below, utilized in establishing the suitable randomness for the uniform filter. A set of electronic messages 315 represented by $X_s$ having characters $x_i$ and $x_{i+1}$, $x_{i+2}$, ... $x_{i+n}$, from a data source $\{x\} \in X_s$ are sampled for purposes of creating a hash digest 332 data base. Emails received are compared 370 to the stored digests to determine whether there are matches. More particularly the messages $X_s$ serve as inputs to a uniform filter 320, which forms a feature vector 325, the elements of which are short hash values. The totality of the elements of the feature vector 325 is variously referred to as a hash digest of the message. The signatures are stored in the hash digest 332 data base for later comparison to email utilizing a threshold 340, typically achieved in real time. An input stream of email messages (presumably some of which are in a class to be determined) is received at an input stage 355. The input stream may be denoted as $X_m$ having characters $x_i$ and $x_{i+1}$, $x_{i+2}$, ... $x_{i+n}$, from a data source $\{x\} \in X_m$, such as may be incorporated in data packets, a random access memory or a continuous record (as might be contained in an email), which are typically stored and buffered in a data register for processing. The data elements $\{x\}$ may be in the form of a coded transmission such as ASCII, which serves as input to a uniform filter 360, having identical characteristics as the uniform filter 320. A feature vector 365 is created for final comparison and result 380 to the hash digests 332 utilizing the threshold 340.

The computer method as illustrated in FIG. 3 also includes the random matrices 312, the elements generated from a set of filters such as 320, and which individually sum over neighboring pairs of received messages $\{x\} \in X_s$. The matrices 312 typically comprise 100 separate matrices each having 256× 256 elements having entries in the range 0 through 255 base 10. In one embodiment the entries are a product of a timestamp operating in conjunction with a pseudo-random number generator. The pseudo-random number generator produces a sequence of entries of numbers in the range 0 to 255 base 10 that typically exceeds 33,000 places to the left and 33,000 to the right.

The method of optimizing the comparison of hashes utilizes random vectors $V_m$, $V_s$ with the same or similar distributions as found in ASCII values. For this reason, the mathematical schema used for computing the random vectors is known as the uniform filters method. Subsequently, the uniform filter 360, utilizes values from the random matrices 312 as may have been transferred to random function matrix 352 in connection with creating the feature vector of the email under investigation.

The uniform filter computer method comprise the steps of: (a) receiving a plurality of hashing vectors from a set of documents and storing said sample hashing vectors into a random access memory; (b) loading a data register with at least two adjacent data elements from a received document; (d) computing an email hashing vector utilizing a hash means; (e) and comparing the email hashing vector with the plurality of sampled hashing vectors.

Figure 3D:
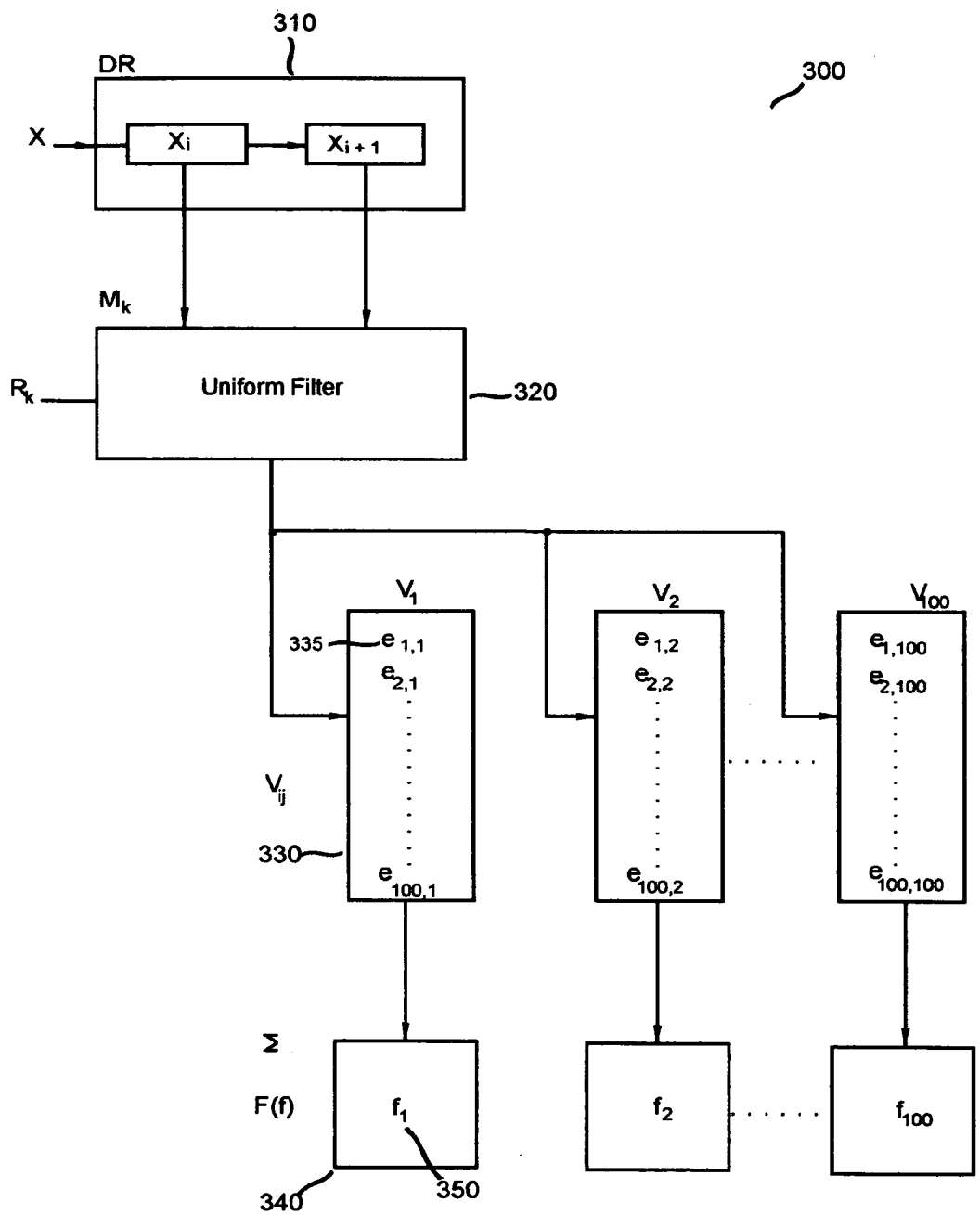
FIG. 3d shows a block diagram of the uniform filters employed in the present invention.

Referring to FIG. 3d, a uniform filter system 300 the electronic message X for purposes of both creating the digest and thereafter for comparing is explained by considering a stream of characters $x_i$ and $x_{i+1}$, $x_{i+2}$, ... $x_{i+n}$, from a data source $\{x\} \in X$ such as may be incorporated in data packets, a random access memory or a continuous record (as might be contained in an email) which are typically stored and buffered in data register 310 DR for processing. The data elements $\{x\}$ may be in the form of a coded transmission such as ASCII, which is typically translated or denumerated for processing. Although any arbitrary number of data elements may be stored in the data register 310 chosen for processing, the inventors have determined that at least two adjacent data elements $x_i$ and $x_{i+1}$ serve as the data structure for one embodiment.

The data $x_i$ and $x_{i+1}$ are utilized as input to a filter function 320 M configured to provide a mathematical function representing a uniform filter $M_k$, which calculates a series of vector 330 $V_{ij}$ elements $e_{ij}$, $e_{i+1,j}$ ... $e_{i+99,j}$ for the first input $x_i$ and $x_{i+1}$ pair where j=1. Upon having calculated the vector $V_{i,1}$ a new pair of adjacent data elements $x_{i+1}$, $x_{i+2}$ are loaded into the data register 310 DR. The new data elements, $x_{i+1}$ and $x_{i+2}$ are then utilized as input to a second uniform filter $M_k$ function, which calculates the vector $V_{i,2}$ elements $e_{i,2}$, $e_{i+1,2}$ ... $e_{i+99,2}$. The particular uniform filter function is determined by both the formula or algorithm, chosen to operate on the inputs as well as the random variable R chosen for calculating $V_{ij}$ elements $e_{i,j}$. The technique of using adjacent data elements and shifting or moving the data elements $X \in \{x\}$ one position or byte is referred to as shingling, and is a technique found in the prior art. Shingling is not a requirement of the invention inasmuch as other ways of forming the operands $x_i$ and $x_{i+1}$, $x_{i+2}$, ... $x_{i+n}$, from a data source $\{x\} \in X$ are found to be gainfully employed. Notably, the method of selection of uniform filters functions $M_k$ as described herein in conjunction with the shingle technique, as described is novel.

In one embodiment of the present invention the filter $M_k$ is formed to accept two adjacent 8 bit characters. From these two data the required vector $V_{ij}$ element $e_{ij}$ can be calculated.

In general, the filter 320 $M_k$ of the present invention produces a character string of variable length; however, in one embodiment, each of the filter 320 $M_k$ outputs a number in the range 0 to 255. The number of the statistically relevant filters $M_k$ typically represents the length of the string and in one embodiment it is in the range of at least 1 to a maximum 100 although other lengths may be employed as the application dictates.

In creating each uniform filter 330, the filter $M_k$ (x)=[$M_1$, $M_2$, . . . , $M_{100}$], represents a pre-assigned mathematical function that utilizes as a parameter a "mother random sequence" $R_k$ that serves as a seminal generator, which for purposes of illustration may be chosen as $2^{16}$ characters in length. The statistical properties of the random number generator are found in the hash function patterns of the ultimate feature vectors 340. The filters have the same distributions as the feature vector (number of occurrences of an ASCII value). Thereafter the statistical property of the filter function, which in some applications resembles a Gaussian distribution function, serves to produce hash values.

More particularly, the filter functions for filter 320 $M_k$ (x, R) are chosen such that they comprise a set of uniform distribution functions as illustrated in FIG. 3d, wherein an arbitrarily long random number generator chooses a random number $R_k$ that determines the starting point for the calculation. As for example, the sequence $R_k$ might be limited to the first $2^{16}$ characters in an irrational number. To form filter $M_{k+1}$, the starting point is shifted to the right one element, byte or character to obtain the next higher counting place. In this process a uniform distribution is formed, which provides the elements for a random matrix, the source for the random numbers $R_k$. In one embodiment the matrix data is utilized as a factor in a mathematical formula, which utilizes the data elements in {x} and random number $R_k$ in the filter $M_k$ to form $V_{ij}$ 330 vector elements 335 $e_{ij}$. Such mathematical functions are a design choice and may comprise logical functions in the class of exclusive "or" or analytical functions such as found in systems of linear equations, non linear equations, and series such as determined by Fourier transforms and power series.

In a subsequent step, all vector $V_{ij}$ elements 335 $e_{ij}$ are summed $f_i = \Sigma e_{ij}$ to produce one hash element 350 in the feature vector 340 referred to as F(f). If 100 filters $M_k$ compute 100 vectors $V_{ij}$, then the feature vector 340 F (f) will consist of 100 hash elements 350.

The feature vector elements 350 depicted as $f_1, f_2 \ldots f_n$ are compared to corresponding feature vector elements stored as signatures $f'_1, f'_2 \ldots f'_n$. The difference "d" between the elements of two feature vectors $d(f_i, f'_i)$ is, as previously indicated, the distance. If the distance is less than a pre-selected threshold $\tau$, the feature vector 340 F(f) is determined to represent a spam class. As previously indicated, the inventors have found that a threshold of approximately 13 serves to classify at least one type of spam. Those skilled in the art recognize that other thresholds will produce other classifications of other types of emails, such as related by source of the email or by subject matter of the email.

Figure 4A:
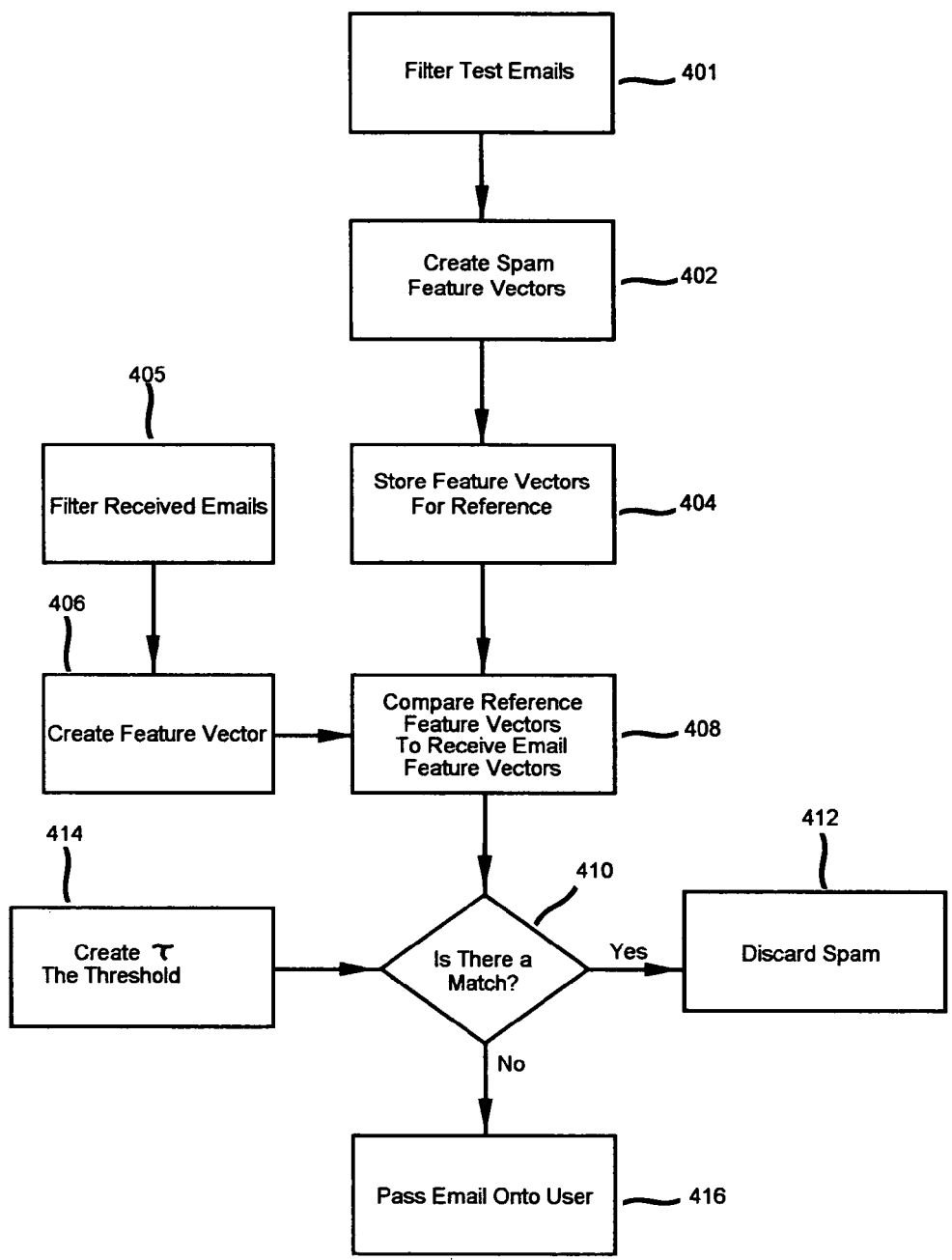
FIG. 4a is a block diagram of the methodology of the present invention.

With reference to FIG. 4a, the methodology of the present invention filters selected test emails 401 to create document having identified attributes feature vectors 402 that are stored 404 in a database for reference. Subsequently, a contiguous stream of 200 8-bit characters, typically ASCII characters converted into an integer, are filtered 405 pair-wise, utilizing the filter class as used in filtering selected test emails. The output from the filter is summed to create a feature vector 406, which the method compares 408 against the stored feature vectors 404. The compare step 408 computes the difference "d" between the elements of the two feature vectors (406, 404). Step 410 compares the difference to a threshold 414 $\tau$ and if the difference is less than a pre-selected threshold $\tau$ the email associated with the feature vector 406 is discarded 412. In step 410, if the difference is greater than a pre-selected threshold $\tau$, the method passes 416 the email associated with the feature vector 406 to the recipient.

The uniform filter method computes the feature vectors 402 (e.g. $V_1, V_2, \ldots, V_j, \ldots, V_{100}$) of the sample emails offline. The idea behind having multiple random vectors is to produce an output vector with multiple entries. Hashes produced by the inventive method produce random vectors Vj with the same or similar distributions as the message ASCII values. A longer vector is more likely to produce a more reliable comparison than a shorter vector. In any case, in order for a comparison of two distinct objects to be meaningful, their hashes must be of the same length.

In a preferred embodiment the incoming email samples in step 401 and the latter received emails in step 405 are parsed into a message P of length 200. In the event that the uniform filter computes the product of two 8-bit byte numbers, then the associated vectors as produced in steps in 406 and 402 respectively should be of length at least $2^{16}$ in order to accommodate the largest possible numerical product of two ASCII characters (255×255 is bounded by $2^{16}$). In reality, the parsed message's characters do not take values in the whole range [0,255], since the parsed message contains only alphanumeric characters.

Furthermore, the random vectors as produced in steps in 406 and 402 respectively should contain integer entries, since a goal is to produce a digest consisting of 100 filter values ranging from 0 to 255. A collection of "sampling functions" for j=1, 2, . . . ,100 is defined, wherein each of the two hundred characters in the parsed message should be at least one of the arguments of one of the sampling function. The following example illustrates the case where each character P is used in exactly one sampling function: $\{N_1(P_1, P_2), N_2(P_3, P_4), \ldots, N_{100}(P_{199}, P_{200})\}$ Each argument illustrates the possibility that each character of P is used in each sampling function: $\{N_1(P_1, P_2, \ldots, P_{200}), \ldots, N_{100}(P_1, P_2, \ldots, P_{200})\}$ While this suggests what arguments the sampling functions may take, the form may be arbitrary. The efficiency of the feature vector depends on the amount of computation required to compute the actual values of the sampling functions. To this end, one should take the sampling functions to be evaluated by a matrix lookup procedure. It is acceptable for offline initialization of the sampling functions to require substantial computation, so long as the actual evaluation is not costly. In any case, these sampling functions are then used to form the filter array.

The random matrices allows the computation of the nearest neighbor functions described previously by so-called "matrix lookup" steps. The size of the storage in memory should approach or equal: $x_{\{i\}}+256*x_{\{i+1\}}$.

An email data stream $X_a$ that produced the first feature vector $V_{a1}$ and an email $X_n$ that produces the feature vector $V_{bn}$ can be quite different over long periods of time. As a result, even though pair-wise the first vector is within $\tau<1$ of the second vector, and the second of the third, this may not always provide an optimum solution for distinguishing classes. In other words, it is not reasonable for class membership to be defined transitively. At the other logical extreme, it is not reasonable for class membership to be defined by a radius from a single vector such as the first. In the case above, only one member of the class defined by the first vector $V_{a1}$: 2, 2, . . . , 2 would exist. This is not satisfactory since very likely the third and fourth also belongs to the same class as the first vector. Therefore one method and system divides the space of feature vectors by choosing distinguished points as centers of balls of radius τ. However, the method storage of vectors is not static, but a store of vectors that are being added to in real time. To deal with real time flow, the method defines a "current register" with upwards of 10,000 vectors in the preferred embodiment. The oldest in time loses eligibility as a center of a class ball as the newest one comes and stays for exactly 10,000 units of time (demarcated by the inflow of 10,000 new vectors into this dynamic database). The way distinguished centers share the set of class ball centers is dynamically changing with time. Selection is based on spatial criteria, techniques of which are known to those practiced in the art of statistics.

Figure 4B:
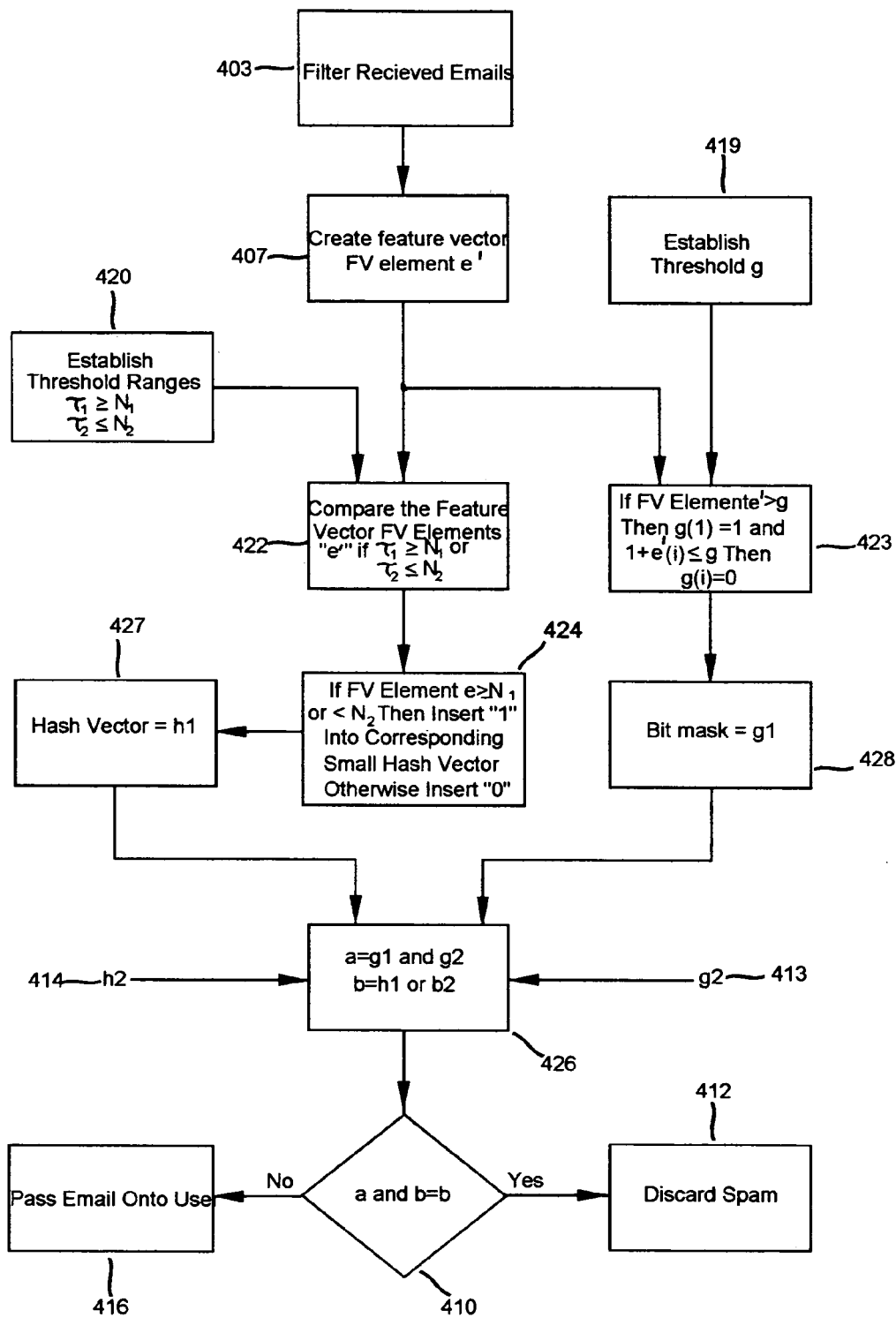
FIG. 4b is a block diagram of an alternate methodology of the present invention.

One alternate embodiment referred to as the small hash method, FIG. 4b illustrates the methodology of the present invention wherein the step of filtering 403 a contiguous stream of 200 8-bit characters pair-wise (typically ASCII characters converted into an integer) utilizes a uniform filter to produce 128 or $2^7$ feature vectors. The output from the filter is summed to create a feature vector in step 407, which is compared 422 against two related thresholds in step 420 referred to as $\tau_1$ and $\tau_2$.

After computing some quasi-invariants from the original (long) hash, the resulting strings are useful for identifying clusters of email.

Feature vectors may be any arbitrary length; however, one embodiment utilizes a feature vector having 128 or $2^7$ elements to discriminate a document having identified attributes email. In the 128 element feature vector, each element is represented by an 8-bit byte.

The establishment of $\tau_1$ and $\tau_2$ is based upon experimentation, where a document having identified attributes is operated on by uniform filters to determine the values of the elements e' of the feature vector as formed by uniform filtering pair-wise, a contiguous stream of 200 8-bit characters, typically ASCII characters that have been converted into an integer. The method sums the uniform filter output to create a feature vector having a distribution function with a mean (m) and variance (v) that is regarded as stationary. A distance (a statistic s') from the mean m is chosen based upon experimentation that has discriminated spam from non-spam.

In step 422 the values of the feature vector elements e' are tested against $\tau_1$, and $\tau_2$, which may be regarded as a statistic (m+/−s'). Beginning with the first feature vector 407 element e'(1): if e'(1)>(m+s') or if e'(1)<(m−s') is true then set the state 424 of a first element of a hash vector h (1)=1, otherwise set the state in step 424 of a first element h(1) of a hash vector created in step 427, equal to zero. The step 424 is repeated for each of the elements of the feature vector 407 and corresponding hash vector step 427 to produce elements "h". Therefore, for each e'[i] a small hash is generated where h1[i]=1 if e'[i]>m+s' OR e'[i]<m−s'; otherwise h1[i]=0.

Based upon experiments, a parameter g establishes 419 a quantizing element used in connection with whether e'(i) is greater or lesser than the quantizing element. In a subsequent step a bit mask is generated 428 based upon a step 423 where if e' [i]>g1, then g1[i]=1 and if e'(i)≦g1, then g1(i)=0. Thus, given 128 byte feature vector (i) a 16 (i.e. 128/8) byte small hash vector is generated and (ii) a 16 byte bit mask is generated for a total 32 bytes. The small hash and bit mask tests are both necessary to check whether two filter values are similar.

Once the 16 byte small hash is created and the 16 byte bit mask is created the value of these two bytes are used to determine an email's similarity to a spam hash vector 414 h2 and bit mask 413 g2. The email under examination has a bit mask and the small hash g1 and h1 respectively, which is utilized in a computation with g2 and h2 exemplar bit mask and hash vector from known samples of spam. The computation 426 proceeds to determine: a=g1 AND g2 and b=h1 OR h2. The two hashes are similar if the step 410 yields: a AND b=b; which is equivalent to: (a AND b) XOR b=0.

If there is a match between the computed 427 hash vector value and the stored hash vector value determined in step 428, the spam is effectively discarded 412. If there is no match between the computed hash of step 427 and the stored hash in step 428, the email message is effectively passed 416 to the recipient.

Figure 5:
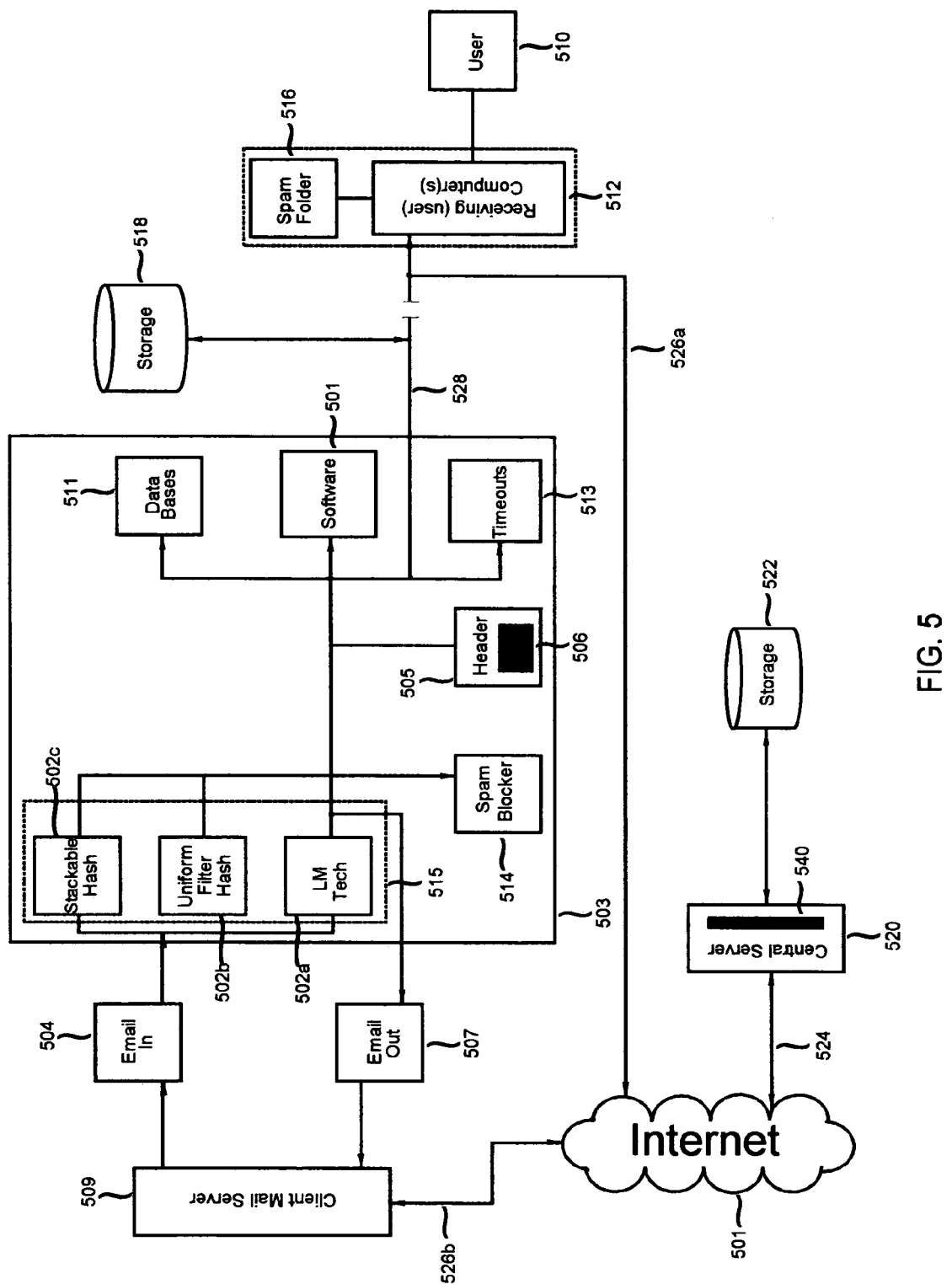
FIG. 5 is a block diagram of the present invention.

FIG. 5 illustrates a conventional Internet 501 system for detecting transmission of potentially unwanted e-mails, comprising a means for observing a plurality of e-mails utilizing a client mail server 509; and as described in FIG. 4a, and FIG. 4b, a means for creating feature vectors on one or more portions of the plurality of e-mails to generate hash values and associated bit masks and for determining whether the generated hash values and associated bit mask values match hash values and associated bit mask values related to prior e-mails. As will be appreciated, a peripheral server 503 may be configured to classify emails and to create clusters of emails as described with reference to FIG. 1a, FIG. 1b, FIG. 2a and FIG. 3c.

In FIG. 5 the Internet 501 connection 526a and 526b allows a user 510 to send and receive email through processors 504 and 507 in association with a client mail server 509 operating in conjunction with a peripheral server 503 operating under the control of a software program 545 that contains a process 515 for carrying out the process shown in FIG. 1a, FIG. 1b, FIG. 2a and FIG. 3c and processes 502(a), 502(b) and 502(c) for analyzing electron data streams in accordance with the hash technology described herein, and programs to access a database 511 which stores such classification and clusters as heretofore described. Server 503 and the associated software can be configured to send email with spam saliency appended through an email processor 507 or to block outgoing spam based upon prescribed rules. A timeout 513 may also be employed in the event a connection is not quickly established with mail server 509. Utilizing the email 504 processor for email input, the process 515 computes, based upon the technology of the present invention, clustering and classification.

The database 511 containing classification and clustering data as created by the system described herein or as is additionally received (a) from an external source 518; (b) or is downloaded through the internet connection, such as internet connection 526b and 524, as may be received from a central server 540 and associated data base 522.

The invention herein includes the learning machine process, and hash technology process 502b and 502c, to create feature vectors and geometric vectors (collectively the "hashing vectors") of the present invention, operating under novel protocols such as described with reference to FIG. 2a, FIG. 2d, FIG. 3c, FIG. 4a and FIG. 4b, for clustering documents and comparing email utilizing the hashing vectors or derivations therefrom stored in a database 511. Except as indicated below, a sender or a receiver of emails typically has no direct control over the uniform hash filter 502a or the stackable hash 502c, which is installed typically within a gateway sendmail server 503.

Once sendmail receives an email 504 from server 503, the email passes onto the learning machine 502a and alternatively to the hash technology processes 502b and 502c by means of software 545 program calls. In one embodiment, the hash technology process 502b and 502c may be installed directly onto the receiving computer 512 or downloaded through the internet connection 501 or through a local area network connection 528. Alternatively, the receiving computer may receive direct information through the local area network connection 528 as to email being held in suspension pending a disposition by the user 510.

The server 503 and associated software 545 functions as a relay for email received and for modifying the message to optionally incorporate a binary header 505. More particularly, learning machine 502a, the uniform filter 502b and 502c individually or alternatively analyze the email 504 content and appends a header 505 to the email 504 data stream, which contains a measure of spamicity 506 that signifies how relatively dangerous the email is considered. Programming means generate the spamicity 506 as a number on an arbitrary scale; however, an administrator can tune the magnitude or parameters during the startup of the processes embodied by processor 515.

The user 510 of the receiving computer 512 and the administrator (unshown) of the server 503 each can decide what action to take based upon a spamicity 506 measure. One scenario by way of example is: by default the hash technology processes 502a and 502b are turned off for a particular user of a receiving computer 512. If the user 510 wants to filter subsequent email 504, it sends a request to turn on the hash technology process 502a and 502b. The hash technology process 502a and 502b may already be turned on, but the user desires to set a threshold value 514 for spamicity, above which emails 504 are not delivered to the user 510, essentially determining aggressivity of the hash technology process 502a and 502b. If the user 510 does not specify the threshold 514 for spamicity 506, a default value, previously established by the server administrator may be utilized by processes 502a and 502b. If the spamicity 506 of the email 504 goes above the threshold 514, the user 510 may invoke a rule to send the email 504 into one or more folders to isolate the email based upon preprogrammed rules and store it in a spam folder 516.

The central server 520 provides a uniform address for client servers, such as peripheral server 503 to communicate worldwide. Its central purpose is to compare caches of all servers in the world then distribute results through the Internet. The cache is constantly rolling over at intervals approaching one minute or less depending on the speed of the hardware and the internet 501 traffic. The goal is to store and to synchronize spam lists of all servers and to create a confidence rating that is dynamically assigned to each enterprise such as may be part of client server 509 to mitigate a malicious attack on the central server 520.

A program 540 stores clusters, classifications, geometric and feature vectors, which in principle can be relatively large. In a basic illustration the feature vector is stored in a file, where the values are read during startup and stored in another memory thereafter. The basic illustration can be made more robust with the integration of the processes embodied in processor 515 with a database, such as by way of example the Berkeley DB, which compares the sendmail aliases file with aliases databases.

In relation to FIG. 5, the hash technology process 502b includes a method for creating a feature vector and utilizing it according to the process disclosed in either FIG. 4a or FIG. 4b. As such FIG. 5 also discloses a computer method for detecting transmission of a class of email, comprising the steps of: (a) receiving one or more email messages; (b) utilizing a learning machine to classify the email; (c) utilizing a K-NN machine to further cluster the ambiguous documents; (d) generating hash values, based on one or more portions of the plurality of email messages; (e) generating an associated bit mask value based on one or more portions of the plurality of email messages; (f) determining whether the generated hash values and the associated bit mask values match a corresponding hash values and associated bit mask values related to one or more prior email messages of the cluster.

The method disclosed further comprises generating a salience score for the plurality of email messages based on a result of the determination of whether the generated hash values and the associated bit mask values match corresponding hash values and the associated bit mask values related to prior email messages of the cluster.

More generally, in accordance with the foregoing the system as disclosed in FIG. 5, provides (a) a means to convert a binary coded message into a set of numeric values; (b) a means to compute a hashing vector based upon the numeric values provided to a mathematical function; (c) a means to compare a difference between the value of the hash vector to a stored vector or digest representing the stored vector; (d) a means to append a header to a spam message based upon the comparison.

Figure 6:
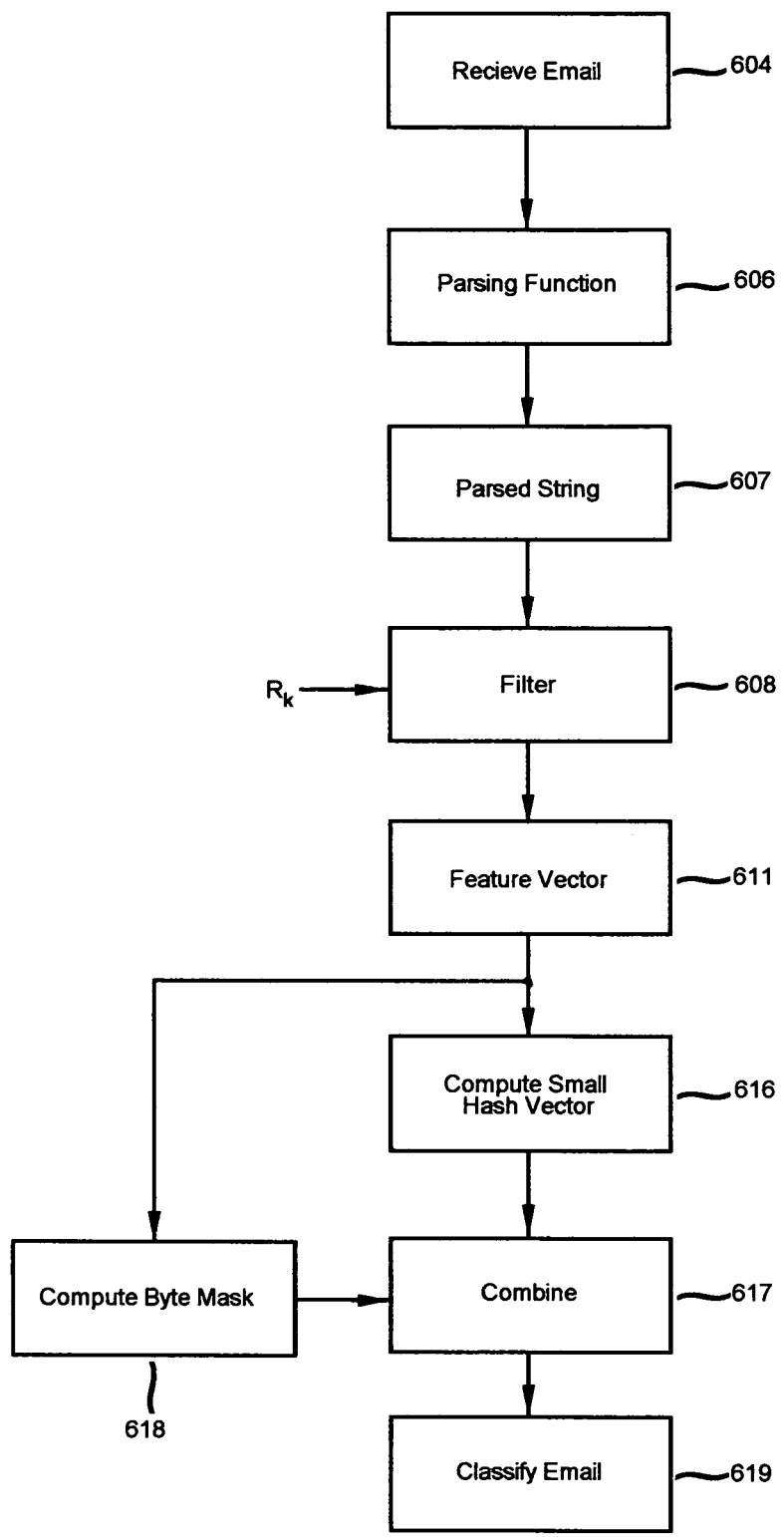
FIG. 6 is a block diagram of the methodology of the present invention.

FIG. 6 refers to the small hash methodology and considers the characters of the email 604 message as: $m_0, m_1 \ldots m_{(n-1)}$, having been recorded and stored in a computer as may be represented by server 503 memory.

The step 604 first strips the message of all non-alphanumeric characters where by way of illustration and not limitation, a "character" may be defined as an 8-bit byte. In one embodiment the input email message comprises a contiguous stream of 200 8-bit characters, typically ASCII characters, and serves as input to a parsing function 606 to produce a 200-character output stream that serves as input to a uniform filter 608. Thereafter, the following five steps 607, 608, 611 are performed to compute 611 the feature vector of the message.

The parsing functions 606, 607 prepare the incoming data stream for processing wherein: $\alpha$ is created by: $\alpha(0)$ taken as the first-occurring alphanumeric character in the message: $\alpha(j)=j_{min}$, where $j_{min}=\min \{k|k>\alpha(j-1)\}$ and $m_k$ is alphanumeric.

At this stage, all upper case letters are mapped to their lower-case ASCII counterparts, so as to treat lower and upper case letters in the same way. For convenience, suppose that the index of the last-occurring alphanumeric character in the message is $\alpha_{max}$. Then there are two cases: A $\{\alpha_1, \alpha_2, \ldots, \alpha_{max}\}<200$ and B $\{\alpha_1, \alpha_2, \ldots, \alpha_{max}\}>200$.

In the first case, the message is then "padded" or extended so that its length (in characters) is 200. Padding is performed as follows: "0" bits are appended so that the length in bits of the padded message becomes 200. In all, at least one character and at most 200 characters are appended.

By way of illustration and not limitation, in its most basic form, the parsing operation 606 removes all non-alphanumeric characters and then truncates the resulting string 608 to two-hundred 200 characters in length. If the string in step 607 results in fewer than 200 characters in length, then the method concatenates zeros as needed, to reach 200 characters in length.

In step 611, a feature vector is created from an application of the filter step 608 upon the parsed message string generated in step 607. For each incoming 604 email message, the filter calculates 608 an entry to the digest 611. Step 616 computes a 16 byte small hash vector as unsigned characters coded in a binary number ranging in value from 0 to 255, although other applications may increase or decrease this range. In step 618 a 16 byte bit mask is also computed from the feature vector and the small hash vector are joined in a logical computation. The value of these two bytes are used to determine an email's similarity to a spam exemplar bit mask and hash vector from known samples of spam. As earlier detailed in reference to FIG. 4b, the computation proceeds to determine a=g1 AND g2 and b=h1 OR h2. The two hashes are similar if the step 617 yields: a AND b=b; which is equivalent to: (a AND b) XOR b=0. In step 619 the result of the step 617 computation permits the classification of the email.

The uniform filtering refers to the piecewise-continuous behavior of the entries of the digest database 511 wherein a small change in the email 504 causes all of the entries of the digest database 511 to change an incremental amount. Performance data has shown that the inventive method herein can perform the hash digest computation of a single email 504 message on a Pentium III personal computer (with standard amount of memory) in 25-50 microseconds. The rate-limiting is pre-processing the incoming email. Nonetheless, the method is scalable, exhibiting better speed on the platforms tested and better scalability in comparison with MD5, the well-known cryptologic hash algorithm.

Finally, the topic of searching an archive of created hash digests 616 efficiently for the purpose of determining similar hashes has been addressed by the construction of small hashes derived from the sample hashes, which allow for quick determination of groups of hash digest 616 that are similar. Optimal search methods are binary or k-ary in nature. Such optimal search methods are well known by those skilled in the architecture and programming for database searching applications.

Figure 7:
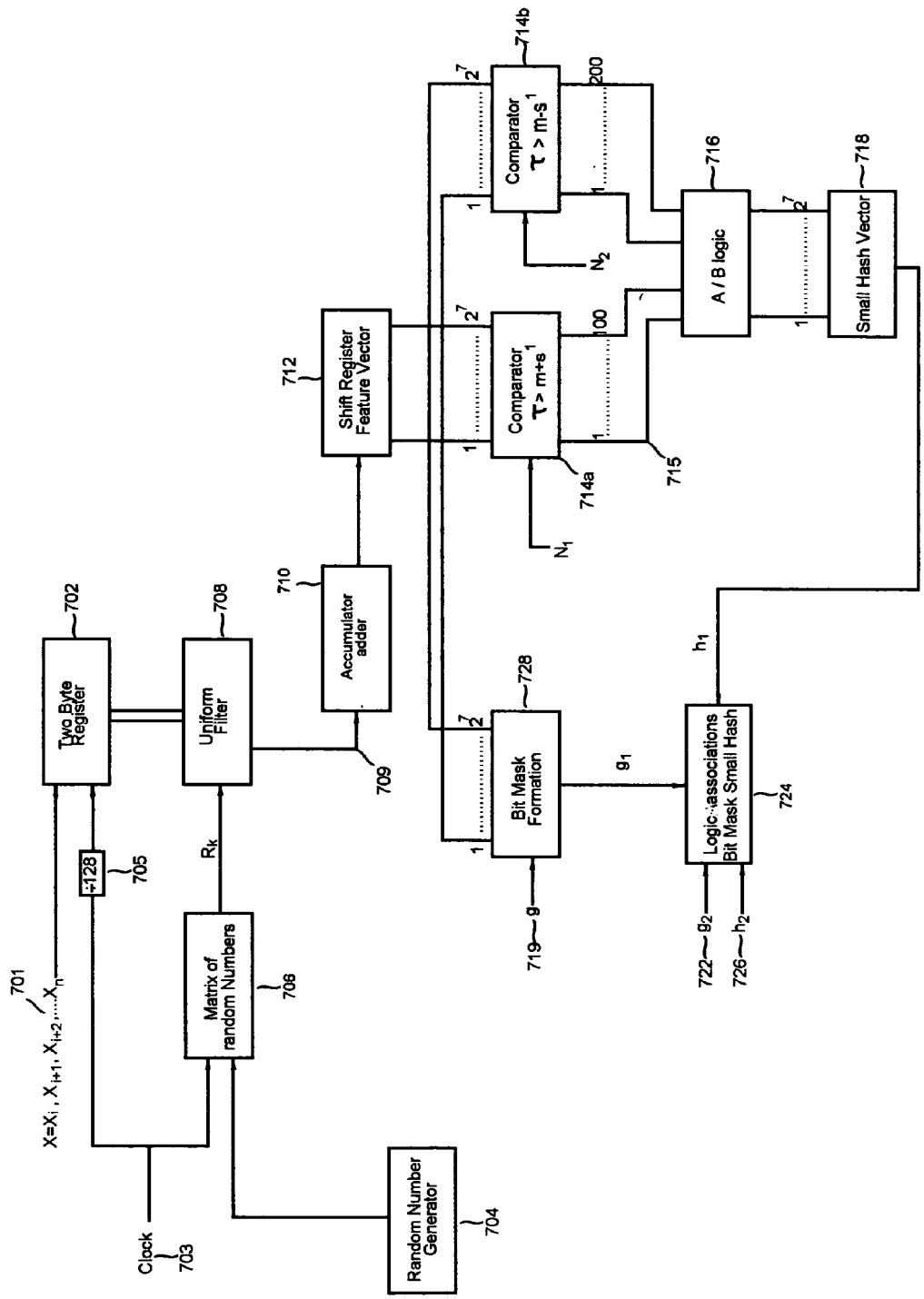
FIG. 7 is a block diagram of an apparatus of the present invention.

As indicated, prior to processing the data elements to produce hash codes, the system produces a set of uniform filters, which have the form of random matrices (by way of example 128 random matrices might be created). These filters may be implemented as programs having appropriate algorithms to construct the filter functions or they may be embodied in hardware. In FIG. 7, an apparatus comprises a uniform filter system for receiving an email having a parsed message as hereinbefore described. The data stream 701 from the parsed message contains at least one, but not more than 255 binary codes. A two-byte register 702, under the control of clock 703 and divider 705 receives the data stream 701. The register 702 serves as input to a uniform filter 708, which also receives input $R_k$ as generated by a matrix of random numbers 706 in cooperation with a random number generator 704. The uniform filter 708 operates on the inputs provided by 128 corresponding random numbers to produce a string of output 709. For each set of input values 701 $X_i$, $X_{i+1}$, and 128 corresponding random numbers, a vector having 128 elements is created and summed in an accumulator 710 to form the $i^{th}$ component of a feature vector register 712 having 128 elements, $i_1, i_2, \ldots i_{128}$. When 128 feature vector elements have been formed, the values of the feature vector element by element are compared to two statistics in comparator 714a and 714b. Beginning with the first feature vector register 712 element r'(1): if comparator 714a r'(1)>(m+s') or if comparator 714b r'(1)<(m−s') is true, then set the output state 715 through the 716 logic gate, providing the "OR" function sets a hash register 718 element h (1)=1 otherwise it sets the state of the hash register 718 h(1) equal to zero. The process of comparing element by element the feature vector register 712 is repeated for each of the elements of the feature vector register 712 to produce the hash vector elements "h". Therefore, for each r'[i] a small hash is generated where h[i]=1 if r'[i]>m+s' OR r'[i] <m−s'; otherwise h[i]=0.

Based upon experiments, a parameter g1 establishes 719 a quantizing element as input to a bit mask formation 728 used in connection with whether r'(i) is greater or lesser than the quantizing element. In a subsequent step, a bit mask is generated based upon a test in the bit mask formation processor where if r'[i]>g1, then g1[i]=1 and if e'(i)≦g1, then g1(i)=0. Thus, given 128 byte feature vector a 16 byte bit mask is formed 128. The small hash and a bit mask tests are both necessary to check whether two filter values are similar.

Once the 16 byte small hash is created and the 16 byte bit mask is created the value of these two bytes are used to determine an email's similarity to a hash vector 726 h2 and bit mask 722 g2. The email under examination has a bit mask and the small hash g1 and h1 respectively, which is utilized in a computation with g2 and h2 exemplar bit mask and hash vector from known samples of clusters such as spam. The computation is performed by the logic 724 to determine: a=g1 AND g2 and b=h1 OR h2. The two hashes are similar if the computation in logic 724 yields: a AND b=b; which is equivalent to: (a AND b) XOR b=0.

Figure 8:
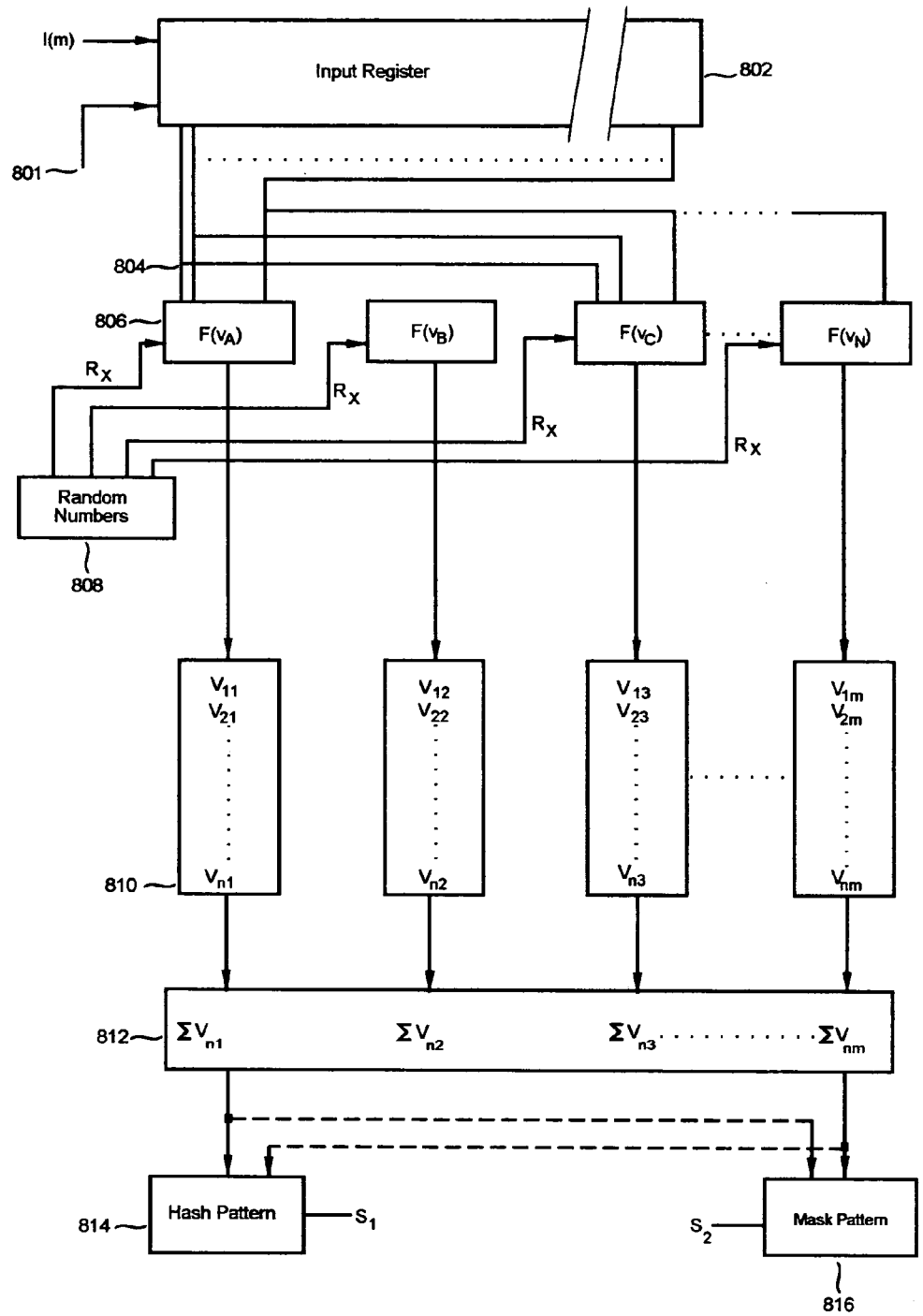
FIG. 8 is a schematic of the filters of the present invention.

FIG. 8 illustrates an apparatus and system for detecting the similarity of patterns to an exemplar pattern. As will be understood by those skilled in the electronic arts, the apparatus and system can be implemented as an analog, digital or hybrid process incorporating analog devices and combinations of digital devices and digital programming means. The apparatus and system in FIG. 8 carries out a process for detecting a pattern in an electronic signal comprising: (a) dividing the pattern signal I (m) into $n_t$ time periods or $n_x$ elements ($n_t$ and $n_x$ elements collectively referred to as n) in a processor 802, having a time interval T or byte length $B_x$ (collectively referred to herein as period(s)); (b) inputting one or more periods of the signal into one or more filters 806; (c) inputting a random signal from a random number generator 808 having $m_t$ time periods or $m_y$ elements ($m_t$ and $m_y$ elements collectively referred to as m) with a time interval T or byte length $B_y$ to the one or more filters 806; (c) computing a feature signal or vector (herein collectively referred to as signal) 810 by utilizing the filter 806 to transform each pattern signal time period by a function of each random signal m; (d) creating a hash pattern 814 by comparing each feature signal period n to a first selected one or more statistics $S_1$ of the pattern; (e) creating a bit mask pattern 816 by comparing each feature signal period n to a second selected one or more statistics $S_2$ of the pattern; (f) combining the hash pattern and the bit pattern and comparing the result to one or more patterns based upon the pattern to be detected; and if a match exists then said pattern is detected.

In a general application of the present invention, FIG. 8 illustrates that in a first time interval, a set of the codes having numerical values is serially shifted under a program control to generate a clock 801 which shifts the set of codes into a register 802 of length L which serves the function of the data register 310 DR in FIG. 3d. As is apparent, the shift register 802 length L has been chosen as any arbitrary length and not therefore limited to carrying two bytes of an incoming message data I (m). As previously indicated, the length of the shift register 802 is a design choice determined by the number of terms utilized in calculation of a feature vector 812.

The discrete coded values in the shift register 802 are utilized as the variables in a mathematical process, which computes at least one element in the feature vector 812, during the first time interval.

In a second time interval, the set of numerical values previously shifted into shift register 802 serves as input 804 to a computational means 806 represented by n uniform filters 806. A random generator serves to generate a series of random numbers, which are used as parameters in a computation by filters 806 $F(v_A), F(v_B), F(v_C) \ldots F(v_N)$. The uniform filters 806 compute the respective vector values during time period $T_2$. In the third time interval, $T_3$, an adder 810 sums the values $V_{nm}$ column-wise to form $\Sigma V_{n1}, \Sigma V_{n2}, \Sigma V_{nm}$, the feature vector 812 with a feature vector elements 812$_1$, 812$_2$, ... 812$_n$ during time period $T_3$. The process carried out in this fashion produces a parallel processed feature vector, since all the input data, typically 200 bytes, resides in the shift register 802.

In the embodiment depicted in FIG. 8, the computational means 806 represented by blocks $F(v_A), F(v_B), F(v_C) \ldots F(v_N)$ may employ any computational means as required to discriminate one electronic signal from another and as such by way of example represents a matrix multiplication to form a set of inner products $V_{11}, V_{12}, \ldots V_{n1}$, a corresponding set of inner products $V_{21}, V_2, \ldots V_{n2}$ through $V1_{1m}, V_{2m}, \ldots V_{nm}$. Following the computation of the inner products, each column set of inner products are summed to form the feature vector $\Sigma V_{n1}$, through $\Sigma V_{nm}$.

Any of the apparatuses and associated means illustrated may be employed in the embodiments earlier described relating to hashing vectors in association with table data base look up or with short hashes. If a comparison of a newly formed vector indicates a similarity to spam, the associated email is tagged with a measure of its spamicity as previously described. Similar benefits are achieved by using embodiments earlier described relating to hashing vectors and clustering for the purpose of identifying emails containing one of a malicious code, a phishing, a virus or a worm. Thereafter the potentially harmful email, such as spam, a malicious code, a phishing, a virus or a worm may be isolated or discarded based upon preprogrammed rules existing in the peripheral server. As an additional feature of the embodiments earlier described relating to hash filters in association with table data base look up or with short hashes, such methods will improve the accuracy of a text classification placed into an unsure region by placing the documents having greatest similarity into one cluster.

Applications

As previously indicated in one embodiment, the uniform filter technology and stackable hash technology relate incoming email message to the cluster structure of recent memory. While the uniform filter enjoys the property that the small, lossy hashes are invariant or nearly invariant on clusters, operation of uniform filter requires storage of hash values and search. The uniform filter and the stacking hash each have hash vectors, however, the vectors will be in different spaces (i.e., the uniform filter hash is multidimensional). Operation of the stackable hash method, on the other hand, does not involve storage or search overhead. A typical display of an array of email will have the following exemplar hash values:

| email id | long | short-1 | short-2 | stackable | mask id |
|---|---|---|---|---|---|
| 768444 | 131,... | 1011... | 1101... | 1110... | 3 |
| 768445 | 129,... | 1100... | 1011... | 1000... | 2 |

1. The most interesting meta-data fields relate to cluster structure. All of these involve various threshold parameters. Each of these numbers relates to uniform filter (denoted uniform filter) or stackable hash (denoted stackable hash) and applies to an email of interest.

Figure 9A:
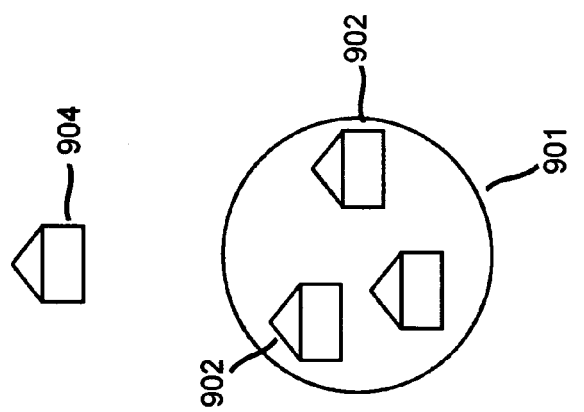
FIG. 9*a* shows a set of accumulated document clusters.
Figure 9A:
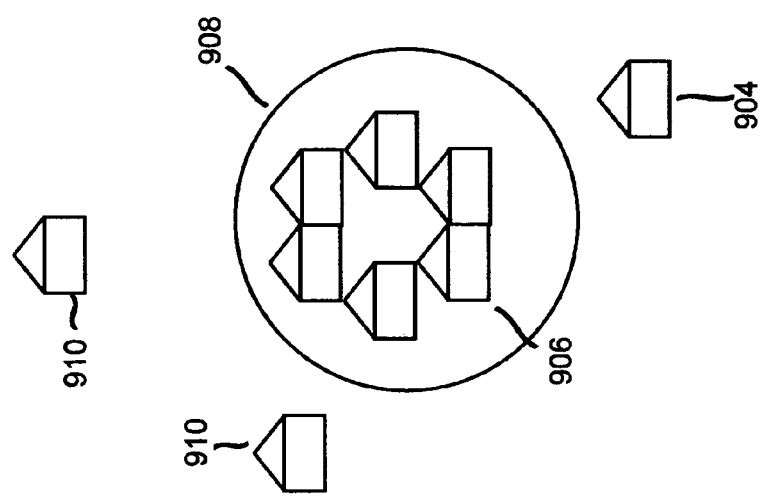

As shown in FIG. 9a, emails 902 belong to clusters 901 and other emails 904 do not belong to clusters 901. Uniform filters produce output similar to the following table, where a "zero" entry for cluster identification ("id") corresponds to an email message which is determined to not be in a cluster. The confidence % is related to the adequacy of $\tau_{uniform\ filter}$.

| email id | Cluster id | confidence % | size of cluster | cluster radius |
|---|---|---|---|---|
| 912567 | 3 | 96.8245 | 8754 | 4.2542 |
| 912568 | 2 | 99.9971 | 12425 | 4.4632 |
| 912569 | 4 | 83.2455 | 101431 | 8.1244 |

Two different methods exist for checking the effectiveness of uniform filter, either by checking email messages at random from the entire collection of email id's; and/or checking the email messages on a cluster-by-cluster basis.

Figure 9B:
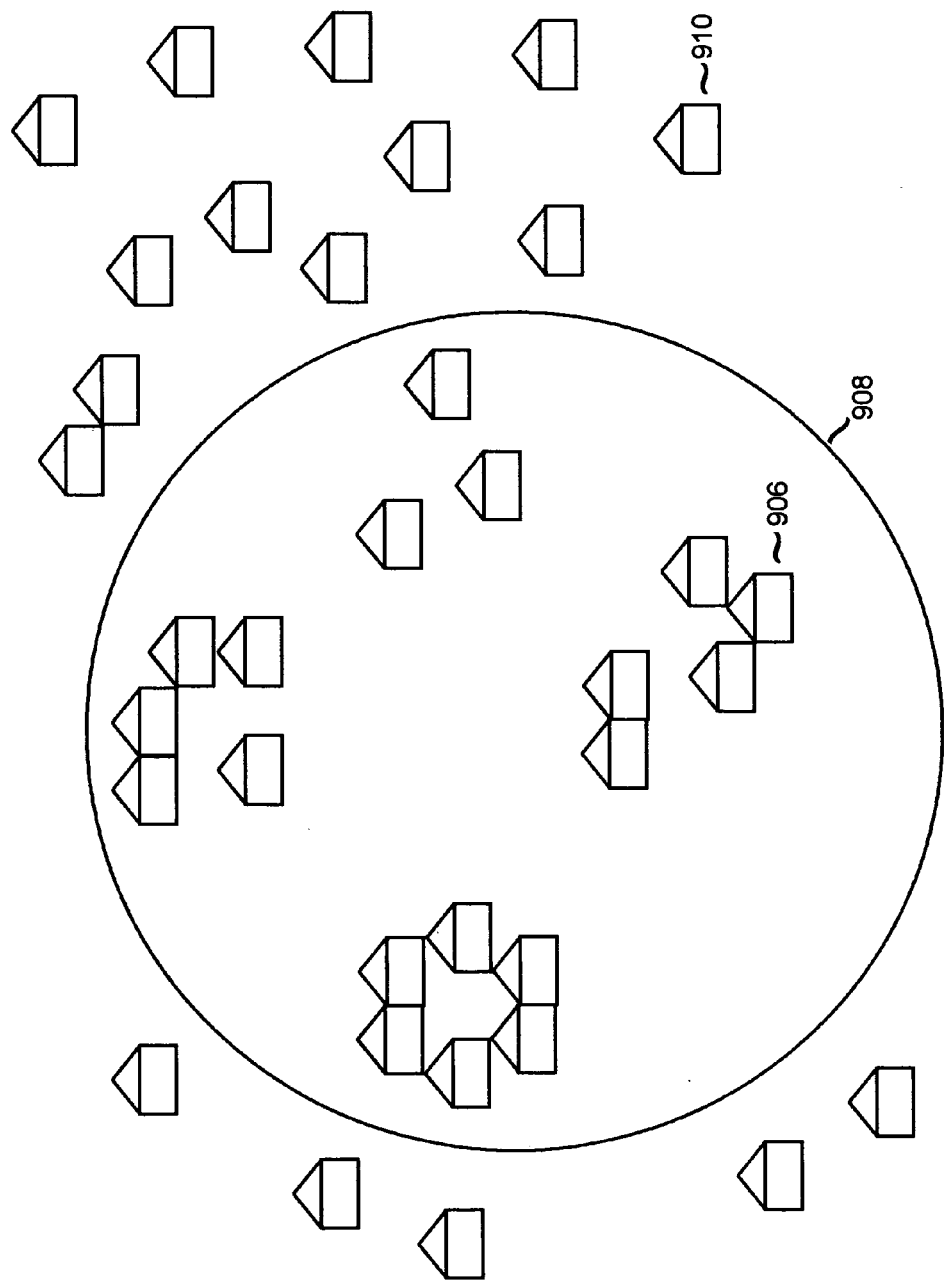
FIG. 9*b* shows a set of accumulated document clusters.

Stackable hash determines whether an email message belongs to some cluster 901. All of the email 906 messages inside the large circle FIG. 9b are members of a cluster 908; while all of the email 910 messages outside the large cluster 908 are not members of the cluster 908.

The output for stackable hash is simpler than that for uniform filter. Here confidence as a percentage (%) is related to a microscopic cluster number $N_{stackable\ hash}$:

| email id | cluster membership | confidence % |
|---|---|---|
| 716425 | yes | 63.1243 |
| 716426 | no | 83.1254 |
| 716427 | no | 97.4421 |

Similarly, two different methods exist for checking the effectiveness of uniform filter: i.e., check email messages at random from the entire collection of email id's; and check email messages on a cluster membership basis.

Cluster Delta Storage ("CDS")

A feature of all emails is that they carry similar, but not necessarily identical information. For example, bank statements differ by recipient names and account details. Spam emails usually carry a certain amount of random misspellings aimed at bypassing spam filters. No matter what is the source of such emails, storing them is rather expensive. A ten-kilobyte email sent to a hundred thousand users will cost a Gigabyte of disk space. It is rather obvious that storing all such emails as they are is a waste of disk space. Since all mass mailing emails originate from templates, storing such emails means storing same template with little modifications over and over again.

CDS is an effective means for the efficient storage of mass mailing emails of any type at the enterprise level. The forgoing method serves to improve scalability, speed, compression and source independence.

The key idea behind CDS is that computer systems need to store the template only once and the modifications should be stored separately. A method of the present invention stores the difference between a template and the representative/email message of the cluster. By way of example and not limitation, consider 100,000 email invitations ("eVite") each requiring $10^4$ bytes of storage for the message including name. Storing $10^5$ emails, each $10^4$ bytes in length, requires $10^9$ bytes or 1 GB of memory storage. Limiting storage to the eVite template and the recipient's name having $10^2$, and storing each separately, require at most $10^7$ bytes of storage for the names and $10^3$ bytes for the message. Thus storing modifications with template takes only 10.01 MB storage, which is substantially smaller than 1 GB—the amount of space needed to store original emails. If it is decided to compress the original emails, the amount of disk space saved will still be much larger than the uncompressed modifications. To summarize, if the system stores templates and modifications separately it saves disk space without loss in extraction speed as opposed to traditional compression. Since the typical compression ratio for traditional tools like bzip2 is approximately 0.5, it is possible that modifications made to a template are so large that a whole document compressed using traditional methods turns out to be smaller than the uncompressed document.

To find clusters of similar emails the method of the present invention utilizes a hash. It is a fast and scalable algorithm that is best suited for this particular goal. Once all the emails are mapped into the vector space using the hash, clusters of similar emails can be found. Once the clusters are found the system reconstructs the template (e.g. choose a smallest document from a cluster as a template). Once the template is found a binary differential algorithm (a template using the shortest member of a cluster) is used to store the difference between the template and the emails it produced. To show how CDS can save disk space the inventors applied it to a worst possible case referred to as randomly polluted text. One hundred emails were culled from a mailbox. Each of these emails was used to produce ten more randomly polluted emails. The degree of pollution is referred to as "noise level". For example, a noise level 10 corresponds to every tenth email out of one hundred being replaced by a random character. The average size of emails was 5.5 kilobytes. Our goal is to compare delta storage of the present invention with traditional compression methods, such as bzip2. The degree of document compression is referred to as "compression factor" which is a ratio of compressed email size (using either bzip2 or CDS) to the original email size.

Overall, the delta storage method comprises the steps of: (i) creating clusters; (ii) sorting clusters; (iii) labeling to clusters; (iv) taking shortest email of each cluster as representative; (v) taking binary differential function on all other members of cluster; (vi) tagging compressed emails so as to make sure they stay with the clusters.

This ratio is then averaged over the cluster to produce the cluster-specific compression factor. Compression factor changes from cluster to cluster as can be seen in FIG. 10, which shows compression factors for CDS and bzip2 algorithms as a function of the noise level. The error bars indicate root mean square ("rms") deviations of the compression factor for various clusters. CDS provides for almost an order of magnitude compression gain at low noise ratios. Even for a noise level of 10 the compression gain is roughly five.

Labeling

An embodiment of the present invention is a method for auto-labeling emails according to instantiation of labels, whether these labels are pre-defined or user-defined. Labels can be multiple-to-one. For example, an email message which has as its subject an invoice payable to an advertising company can be described as both "advertising" and "financial" related. Google's mail service, known as "Gmail" introduced this functionality for the user. The way Gmail works is that the user must proactively create and assign labels. Users can then edit label names, assign arbitrarily many labels to a given email and remove any number of the labels already assigned to a given email. Hash technology is differentiating in that it is able to apply the inventive methods to multiple-to-one applications by assigning a separate SVM for each label of interest.

Schemes for making email labeling more user-friendly and less time-consuming divide into two types: (a) user creates labels; and (b) user does not create labels. In the first type, it is assumed that the user begins assigning labels. Label-creation requires at least one assignment in Gmail. Hash technology is unique in that it embodies an optimal combination of machine-learning and clustering methods of the present invention. The machine learning acquires sufficient training after a threshold number of instances of each label are executed. Therefore, the functionality of the present invention is the automatic labeling after sufficient instantiation has been executed.

In the second type, varieties of predetermined labeling schemes exist, as by way of example:

$S\_1$={home, auto, shopping, family, events, personal}
$S\_2$={tuition, dining, telecommunications, performances, parties, classes, financial aid}

Two possibilities exist for functionality in this case. First, users are able to instantiate using the labels offered. Or alternatively, labeling would start automatically using default training parameters. These default training parameters would be determined by classification utilizing long or short hash of the present invention. This may be done by examination of a large corpus of home user email. The inventive methods also provide users with the ability to populate a hash table for anonymous sharing of information between organizations.

It is expressly intended that all combinations of those elements that perform substantially the same function in substantially the same way to achieve the same results are within the scope of the invention. Substitutions of elements from one described embodiment to another are also fully intended and contemplated.

I claim:

1. A computer method for labeling an electronic communication data stream comprising the steps of associating an electronic data stream with a predefined class by one or more learning machines including when the electronic communication data stream is ambiguous, comparing the outputs from the learning machines with stored predefined output to determine the label to associate with the electronic communication data stream, and labeling the electronic data stream.

2. The method as in claim 1 wherein a neural network processing results in identifying and classifying the electronic communication data stream.

3. The method as in claim 1 wherein a support vector machine processing results in identifying and classifying the electronic communication data stream.

4. The method as in claim 1 wherein a naive bayses processing results in identifying and classifying the electronic communication data stream.

5. The method as in claim 1 wherein an outlier class is identified by an administrative function.

6. The method as in claim 1 wherein a K-NN processes the ambiguous class providing for placement within a cluster of similar electronic communication data streams.

7. The method as in claim 1 wherein the electronic communication data stream is a portion of a document.

8. The method as in claim 7 wherein the document is an email.

9. The method as in claim 1 wherein the electronic communication data stream is a portion of an image.

10. The method as in claim 1 wherein the electronic communication data stream is a portion of sound file.

11. The method as in claim 1 wherein hash technology processing results in classifying the electronic communication data stream.

12. A computer method for text-classification, the method comprising: combining SVM, NB, K-NN, naive-bayes and NN processes to optimize a machine-learning utility of text-classification comparing output of the optimized machine-learning utility to stored text-classifications, and classifying text based on the comparison.

13. A computer method for labeling an electronic data stream as belonging to a predefined class comprising the steps of identifying an electronic data stream by one or more learning machines including when the electronic data stream is ambiguous, comparing the outputs from the learning machines with stored predefined output to determine the label to associate with the electronic data stream, pre-defining a label for email users by processing and analyzing aggregate data compiled from an email content and label, and labeling the electronic data stream.

14. A computer method for labeling an electronic communication data stream as belonging to a predefined class comprising the steps of identifying an electronic communication data stream by one or more learning machines including when the electronic communication data stream is ambiguous, comparing the outputs from the learning machines with stored predefined output to determine the label to associate with the electronic communication data stream, deciding whether to use a uniform filter or a stackable hash to determine a cluster for the electronic communication data stream, and labeling the electronic data stream.

15. A computer method for labeling an electronic communication data stream as belonging to a predefined class comprising the steps of identifying an electronic communication data stream by one or more learning machines including when the electronic communication data stream is ambiguous, comparing the outputs from the learning machines to determine the label to associate with the electronic communication data stream, deciding whether to use a uniform filter or a stackable hash to determine a cluster for a document having identified attributes email, and labeling the electronic communication data stream.

16. A computer method for labeling an electronic communication data stream as belonging to a predefined class comprising the steps of identifying an electronic communication data stream by one or more learning machines including when the electronic communication data stream is ambigiuous, comparing the outputs from the learning machines with stored predefined output to determine the label to associate with the electronic communication data stream, determining an acceptable level of accuracy after use of a K-NN methods to divide space into one or more classes, and labeling the electronic communication data stream.

* * * * *